of Patent:

United States Patent
Prehn

(10) Patent No.: US 8,817,372 B2
(45) Date of Patent: Aug. 26, 2014

(54) SYSTEM AND METHOD FOR MODULATING AND DISPLAYING OPTICAL EFFECTS

(75) Inventor: Horst Prehn, Grünberg (DE)

(73) Assignee: Kommanditgesellschaft Synoptrix Lichttechnik GmbH & Co. (DE)

( * ) Notice: Subject to any disclaimer, the term of this patent is extended or adjusted under 35 U.S.C. 154(b) by 0 days.

(21) Appl. No.: 13/508,333

(22) PCT Filed: Nov. 13, 2009

(86) PCT No.: PCT/EP2009/065159
§ 371 (c)(1),
(2), (4) Date: Jul. 18, 2012

(87) PCT Pub. No.: WO2011/057671
PCT Pub. Date: May 19, 2011

(65) Prior Publication Data
US 2012/0281267 A1    Nov. 8, 2012

(51) Int. Cl.
| | | |
|---|---|---|
| *G02B 27/28* | (2006.01) | |
| *G02F 1/00* | (2006.01) | |
| *G02F 1/11* | (2006.01) | |
| *G03B 21/56* | (2006.01) | |
| *H04S 7/00* | (2006.01) | |
| *G02F 1/13* | (2006.01) | |
| *E04F 13/08* | (2006.01) | |
| *E04F 15/02* | (2006.01) | |

(52) U.S. Cl.
CPC ............... *G02F 1/116* (2013.01); *G03B 21/56* (2013.01); *H04S 7/40* (2013.01); *G02F 1/13* (2013.01); *E04F 13/08* (2013.01); *E04F 15/02* (2013.01)
USPC ............ 359/486.01; 359/486.03; 359/489.07; 359/237

(58) Field of Classification Search
CPC ............ B44F 1/00; E04F 15/00; F21S 10/00; G03B 21/56; G02F 1/116; G02F 1/133528; G09F 19/12; G09F 27/00
USPC .......... 349/96, 117, 193, 194; 353/20, 28, 29, 353/30; 359/237, 245, 246, 279, 285, 291, 359/486.01, 486.03, 489.07; 362/84, 85, 362/86, 97.1, 97.2
See application file for complete search history.

(56) References Cited

U.S. PATENT DOCUMENTS
| | | |
|---|---|---|
| 5,798,807 A | 8/1998 | Prehn |
| 6,389,935 B1 | 5/2002 | Azima et al. |
| 7,646,541 B2 | 1/2010 | Sarayeddine et al. |

FOREIGN PATENT DOCUMENTS
CN    86108149 A    10/1987
(Continued)

OTHER PUBLICATIONS
The International Search Report as mailed on Aug. 8, 2010 for International Application No. PCT/EP2009/065159.
(Continued)

*Primary Examiner* — David N Spector
(74) *Attorney, Agent, or Firm* — Quarles & Brady LLP

(57) ABSTRACT

A system and method for modulating and displaying optical effects includes a lighting device (BV) and at least one displaying object (DO) located outside the lighting device. The lighting device (BV) includes at least one input polarization unit (POE) for influencing polarization, in particular in a location-dependent manner, and at least one modulation unit (OME) for influencing polarization and/or retardance, in particular in a time-dependent and/or location-dependent manner. The displaying object (DO) includes at least one object retarder unit (POB) for influencing retardance, in particular in a location-dependent and/or time-dependent manner, the at least one object retarder unit being suitable for reversibly or irreversibly impressing a piece of image information, and an output polarization unit (PE). Modulated light (Sout) exiting the lighting device (BV) hits the object retarder unit (POB) in order to interact with the piece of image information, whereby optical effects can be visualized by means of the output polarization unit (PE).

22 Claims, 12 Drawing Sheets

(56) References Cited

FOREIGN PATENT DOCUMENTS

| | | |
|---|---|---|
| CN | 1195461 A | 10/1998 |
| CN | 1329726 A | 1/2002 |
| CN | 1524196 A | 8/2004 |
| CN | 1851548 A | 10/2006 |
| EP | 0 648 048 | 4/1995 |
| EP | 0 682 782 | 11/1995 |
| EP | 1 802 113 | 6/2007 |
| JP | 08509555 A | 10/1996 |
| JP | 2007171976 A | 7/2007 |
| JP | 2009037259 A | 2/2009 |
| WO | 94/18598 | 8/1994 |
| WO | 02/069030 | 9/2002 |

OTHER PUBLICATIONS

CH. Sripaipan, et al., "Ultrasonically-induced optical effect in a nematic liquid crystal," Physical Review A, vol. 15, No. 3, Mar. 1, 1977, pp. 1297-1303, XP002573589.

The International Preliminary Report on Patentability for International Application No. PCT/EP2009/065159 dated Jun. 12, 2012.

English Translation of Japanese Office Action dated Oct. 11, 2013 for corresponding Japanese patent Application No. 2012-538203.

The State Intellectual Property Office of P.R. China, English Language Translation of the First Office Action and Search Report, Application No. 200980162443.8, May 5, 2014, 14 pages.

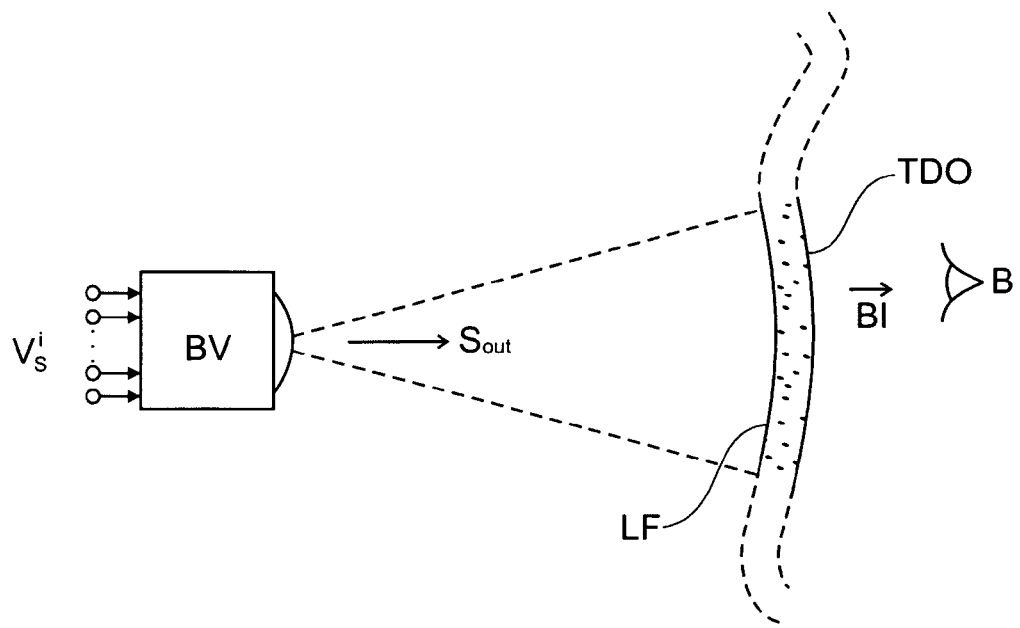
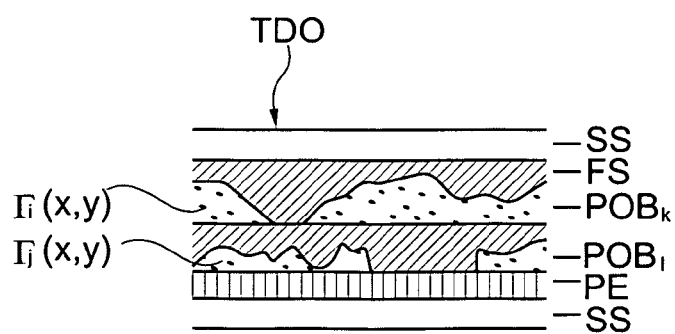
Fig. 1

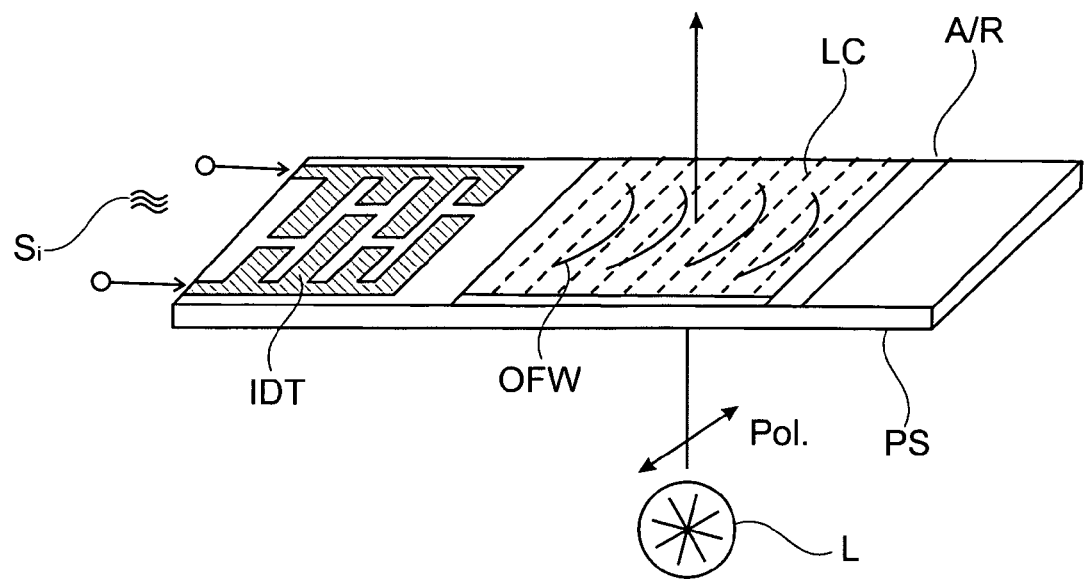
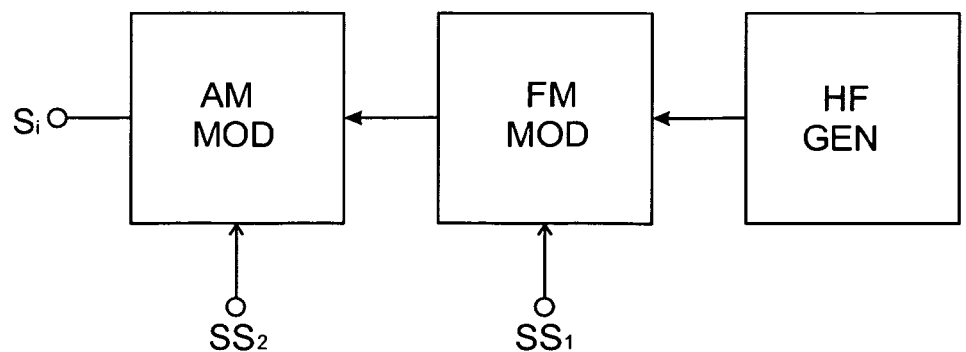
Fig. 4A

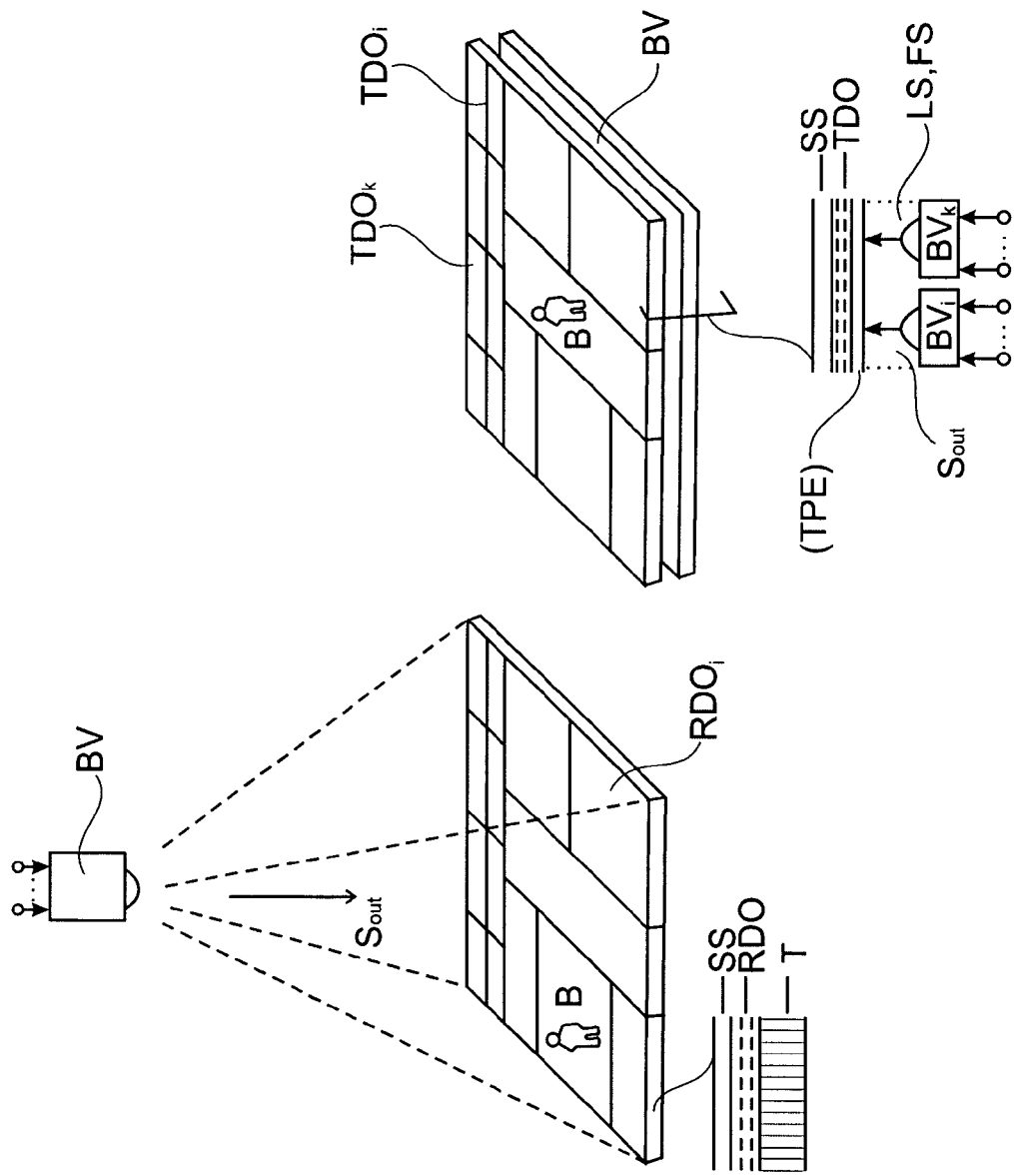

SYSTEM AND METHOD FOR MODULATING AND DISPLAYING OPTICAL EFFECTS

CROSS-REFERENCE TO RELATED APPLICATIONS

This application represents the national stage entry, and claims the benefit of, PCT International Application No. PCT/EP2009/065159 filed on Nov. 13, 2009. The content of the application is hereby incorporated by reference as if set forth in its entirety herein.

STATEMENT REGARDING FEDERALLY SPONSORED RESEARCH OR DEVELOPMENT

Not applicable.

FIELD OF THE INVENTION

The invention relates to a system for modulating and displaying optical effects, and to a method for modulating and displaying optical effects.

BACKGROUND OF THE INVENTION

Known from EP 0682782 is system and method for modulating and displaying optical effects, in which dynamic images are generated and their structure and/or color are modulated by means of various signal sources. However, the disadvantage here is that, owing to the principle involved, the light exiting the lighting device already visibly contains the image information to be displayed. Another disadvantage here is that the system or method is relatively inflexible in terms of the variability of possible displays and possible changes, since only the lighting device itself is suitable for such changes, and the underlying principle allows no changes outside of the lighting device.

SUMMARY OF THE INVENTION

Therefore, the object of the present invention is to propose a new system or method for modulating and displaying optical effects, which avoids the above disadvantages, creates an easier to handle or more flexibly modifiable system or method for modulating and displaying optical effects, and further allows the light exiting the lighting device to do so neutrally and without any visible image information.

According to the invention, the problem is resolved by virtue of the fact that the system for modulating and displaying optical effects exhibits a lighting device and at least one displaying object located outside of the lighting device, wherein the lighting device exhibits at least one input polarization unit for influencing polarization, in particular in a location-dependent manner, as well as at least one modulation unit for influencing polarization and/or retardance, in particular in a time-dependent and/or location-dependent manner, and wherein the displaying object exhibits at least one object retarder unit for influencing retardance, in particular in a location-dependent and/or time-dependent manner, which is suitable for reversibly or irreversibly impressing a piece of image information, as well as an output polarization unit, and wherein the modulated light exiting the lighting device hits the object retarder unit, in order to interact there with the piece of image information, whereby optical effects can be visualized by means of the output polarization unit.

There can here basically be any distance desired between the lighting device and displaying object. For example, it can measure a few centimeters, but also several meters. One advantage to the spatial separation and resultant arrangement of the output polarization unit outside of the lighting device is that the optical path between the lighting device and displaying object is situated between the input polarization unit and output polarization unit. As a result, a visible piece of image information cannot be discerned from the light between the lighting device and displaying object, and appears neutral.

In addition, the spatial separation and operative and/or functional arrangement of the lighting device and displaying object facilitates the ability to change the display of optical effects. Specifically, the display of optical effects can thereby be changed both within the lighting device, and this change can also be effected in the displaying object itself. As a consequences, there are at least two combinable ways in which to change the display of optical effects from both a technical and strictly location standpoint. For example, this offers special advantages in particular for displaying objects that are firmly anchored in artificial structures, such as glazed tile.

The input polarization unit in the lighting device initially serves to generate an input polarization for the used light. The input polarization can here take place both constantly over the entire luminous field, as well as over the luminous field in a location-dependent manner, so that several areas of the luminous field are varyingly polarized and/or not even polarized at all. As a result, the lighting device can be used to ensure the visibility or invisibility of different areas in the displaying object.

The light routed through the input polarization unit then guided in at least one modulation unit, which can initiate a portion of the aforementioned change. For example, this modulation unit can be used to influence the polarization and/or retardance (path difference) of the luminous field in a time-dependent and/or location-dependent manner. A location-dependent influence can here take the form of an influence that varies by location in different areas of the luminous field, and a time-dependent influence can here take the form of an influence that becomes stronger or weaker with increasing time. By appropriately selecting this polarization influence and/or retardance influence, the nature of the light exiting the lighting device can be modulated in terms of polarization and retardance in a location-dependent and/or time-dependent manner, which then results in various optical effects in the displaying object.

The displaying object exhibits at least one object retarder unit, making it possible to initiate a further portion of the aforementioned change. The object retarder unit can here realize the same possible influences in the lighting device as the modulation unit described above, wherein the polarization and retardance influences effected in the object retarder unit can then interact with those from the modulation unit, for example overlap.

In addition, the object retarder unit is suitable for reversibly or irreversibly impressing a piece of image information, thereby further contributing to the aforementioned change. For example, this reversible or irreversible impressing of a piece of image information into the object retarder unit can take place through the targeted, external exposure of a liquid crystal layer, for example, to energy, such as light or mechanical pressure, and/or a controlled and locally effective material transformation and/or structural transformation, and bring about additional changes in effects.

In addition, the displaying object encompasses an output polarization unit, for example which can act as an analyzer. As a consequence, the previously as yet invisible optical effects can then be realized.

The units contained in the lighting device and object retarder unit can there also be provided in multiples, in particular to make the optical effects more comprehensive and interesting, and offer even more possible modifications.

In particular, the composition of the light in the luminous field is characterized by the fact that, while to the naked eye as a whole it appears permanently, unchangingly homogeneous and without any discernible or distinguishable structure or brightness and/or color contrasts, it still is imbued with a specified spatial and/or temporally structured, yet constantly invisible internal composition of light, which also exhibits a parametric light modulation that can be correspondingly controlled by means of several control signals, wherein neither the inner structure itself nor changes therein are perceivable by the naked eye even while varying the composition of light, so that the optical effects arise exclusively within the displaying object when lighting a displaying object in the presence of any other respective objects also being illuminated, while all other objects appear visually unchanged in the process.

To this end, the light exhibits a specific, respectively defined internal composition discernible to the naked eye comprised both of non-polarized and correspondingly polarized portions of light, wherein, proceeding from at least one light source with a defined spectral emission and a downstream polarization unit, which exhibits specific, differing field areas each with a defined polarization direction as well as a non-polarized structure, additional and correspondingly designed polarization optical elements are also integrated into the optical path within the lighting device, which are present in particular in the form of actively actuatable modulation units, and wherein these are used to initiate a targeted, spatial and/or chronological variation or modulation of the respective polarization states and/or optical path differences (retardation) within the respective light portions or luminous field areas polarized in a defined manner, so that these can be used for achieving the aforesaid complex dynamic optical effects within the displaying object, which are incorporated into the respective luminous field.

Also advantageous is the selective and specific polarizing visualization of the latent image information or corresponding optical effects within a displaying object comprised of passive elements taking exclusively a photo-optical approach, by introducing the object into the aforesaid luminous field, and by internally varying the composition of light, without its externally discernible composition of light visibly changing in the process.

It is also advantageous for the process of rendering the aforesaid visualized image information or aforesaid optical effects invisible within the displaying object in an optionally targeted manner to be controllable from the lighting means in such a way as to take place by internally changing the composition of light, while the object continues to be illuminated in a visually unchanged manner.

Also advantageous is the complex and specifically controllable multiparametric variation of pattern and color effects or of image modulation within the DO taking a photo-optical approach by means of the lighting device, without the externally discernible or distinguishable composition of light visibly changing within the luminous field in the process.

It is also advantageous that it be possible to generate, for example, patterns or motifs with a practically unlimited number of color hues and with corresponding color palettes as well as with varying color saturation and color contrasts, and specifically vary them extremely fast, within milliseconds.

It is also advantageous that the displaying object can be molded as desired, for example as a laminar structure (e.g., planar, curved or relief profiled surface element), or also as a three-dimensional structure (e.g., a solid body, hollow body), as well as with a diverse surface composition as well as in any shape variant.

It is also advantageous that exclusively passive displaying objects need themselves not contain any active structural elements or movable mechanical parts whatsoever, or require no power supply or corresponding electrical lines, and that the optical effects can still be actively controlled even in passive objects by, instead of controlling the elements themselves, accomplishing this via light modulation that remains invisible using a respective lighting device.

It is also advantageous that the displaying objects can consist of easily fabricated passive elements, which are cost-effective and mass-producible, and that these displaying objects can be distinguished by simplicity, robustness, as well as the ability to use conventional processing and assembly techniques, so that they can practically be made in a plurality of materials, shapes, and profiles, and with a manifold of surface compositions.

It is also advantageous that a latent piece of image information within an object retarder unit can be contained in the object itself, and can here be present as an optical material composition with a real spatial structure, thereby delineating itself from an otherwise conventional image projection, wherein the latter uses imaging optics to sharply image a respective defined object plane only via an image that can be captured on a screen in its respective image plane. Therefore, given changing projection distances, a corresponding refocusing is in principle necessary in the case of image projection. As opposed to the usual projection processes, this fundamental difference in using a displaying object in conjunction with a simple lighting device or luminous field offers the additional advantage that the respective imaging optics can be omitted entirely, making it possible to also forego the disadvantageous focusing along with the imaging errors that accompany each image, so that material displaying objects that each vary in design and each have differently configured latent motifs can be incorporated, for example, within a single luminous field, and be arranged as desired therein in different ways and at various distances from the aforesaid luminous field, as well as relative to each other at varying spatial depths, and additionally have the space to move around freely therein.

It is also advantageous that, in response to a corresponding control command, the specifically actuatable lighting device can be used to initiate a desired, immediate switch of manifested states within a displaying object, specifically between a visible state (activation state) on the one hand, wherein the latent image information is directly visualized, and an invisible state (neutral state) on the other, in which neither the latent image information nor any related optical effects arise. The application and design-related advantage with respect to a respectively desired visualization of the optical effects lies in the fact that, even given continuous illumination, the impression of the used objects can remain in a neutral manifestation until such time as a desired activation is enabled for a specific period of time. When using a displaying object in transmission, the object can itself remain continuously transparent during the invisible state, and here exhibits no visible structure. When using a displaying object in reflection, only a diffusely scattered reflection layer can shine through as a neutral background behind the transparent optical functional layer. In addition, it is here advantageous that the illumination continue to remain in place during both a change in states and visualization with image modulation, and that the illumination itself can still continue to appear to be unchanged to the naked eye.

It is also advantageous that a practically unlimited number of displaying objects with any shape and dimensions can be freely arranged or moved at any location in a global luminous field, wherein these can be simply incorporated and/or correspondingly freely mobile or removed once again, so that differently configured displaying objects with a variety of motifs can be simultaneously and synchronously animated relative to each other by means of the respective lighting device through light modulation.

It is also advantageous that several image carrying, transparent elements in a displaying object can be superposed and overlapped, and arranged in such a way as to achieve special, three-dimensionally appearing, translucing optical effects as a result.

It is also advantageous that a plurality of light sources with artificial light, preferably also with white light, but also daylight sources can be used while generating the respective luminous field, for example with light modulation, and that the light quality here appears respectively unchanged even during light modulation, as a result of which the aforesaid optical effects play out exclusively in the optical elements themselves, while all otherwise also illuminated objects here appear to remain unchanged, so that the light quality resulting from installation and during operation is permanently retained, for example when lighting an area or object, and hence no disruptive flickering or corresponding color light effects arise either, e.g., as happens in the case of conventional dynamic image projection or color light staging.

It is also advantageous that an instantaneous, real-time control of complex dynamic optical effects is possible, thereby enabling a visualization of various types of dynamic processes (process visualization), wherein the respective procession can be accompanied by corresponding process-relevant signals, or correspondingly correlated with these signals, for example for the visualization of certain process operations based on several corresponding sensor signals or corresponding process control parameters, or for the music visualization or music animation of respective optical effects based on corresponding signals that can be evaluated with the assistance of corresponding algorithms from audio signals.

In an advantageous embodiment, the lighting device further exhibits at least one lighting retarder unit for influencing retardance in a location-dependent and/or time-dependent manner. As a result, the retardance of the light can be specifically changed within the lighting device, for example in various areas of the luminous field, making it possible to give the optical effects a more comprehensive and interesting design.

It is here advantageous, for example when using immovably installed displaying objects, which carry a latent piece of image information with respectively predetermined motifs, that it also be possible at any time to introduce an additional and rapidly changing modification of these already existing motifs, with respect to both their respective currently usable color palette and their motif-related configuration, without a material alteration in the objects or a replacement of the latter being required for this purpose. It is especially advantageous that a respectively desired certain visual performance and its modification be achievable solely with the illumination means by virtue of being able to introduce into the optical path of the lighting device or change out only one or several varyingly designed object retarder units structured accordingly in terms of image, which in this case exhibit a defined, locally addressable delay, which then has the desired effect on the respective manifestation of the motif, without the illumination itself visibly changing in the process.

In another advantageous embodiment, the lighting retarder unit and/or object retarder unit and/or modulation unit exhibit at least one optically anisotropic substance and/or an optically anisotropic material property. For example, the optically anisotropic substance can have a birefringent property, making it possible to influence polarization and retardance.

In another advantageous embodiment, the lighting retarder unit and/or object retarder unit and/or modulation unit can exhibit a location-dependent optical anisotropy and/or a location-dependent layer thickness and/or a location-dependent orientation of a material property and/or a location-dependent helical pitch. These options also make it possible to change the polarization and retardance of the light.

In another advantageous embodiment, the input polarization unit and/or output polarization unit can be replaced or removed. This is because the input polarization unit and output polarization unit are of crucial importance for visualization. If one of these units is not present, visualization of the optical effects cannot take place. For example, a neutral mode in which no effects are visible can be realized as a result.

In another advantageous embodiment, the input polarization unit encompasses areas that initiate no polarization, wherein these areas exhibit a non-polarizing light filter. That is to say, for example, polarizing areas of light in the input polarization unit may give rise to intensity fluctuations within the luminous field, since polarized areas as a rule exhibit less light intensity than non-polarized areas. As a consequence, problems might be encountered during the formation of the desired homogeneous and neutral luminous field, which can be prevented by a non-polarizing light filter in these areas. Therefore, the intensity of the non-polarized areas can be brought in line with that of the polarized areas.

In another advantageous embodiment, the modulation unit exhibits at least one mesogenic substance or mesogenic units, in particular liquid crystal, for influencing polarization and/or retardance in a time-dependent and/or location-dependent manner. Mesogenic substances are easy to process, and offer the desired options for exerting an influence.

In another advantageous embodiment, the process of influencing polarization and/or retardance in a time-dependent and/or location-dependent manner in the modulation unit can be controlled through exposure to energy. An exposure to energy is easy to implement on the one hand and can be flexibly regulated on the other, so as to bring about the desired influences. In particular mesogenic substances can be easily influenced through exposure to energy in terms of their polarization property and/or retardance property.

In another advantageous embodiment, the exposure to energy takes place by using a mechanical and/or sonic and/or thermal and/or electrical and/or magnetic and/or electromagnetic energy generator on the mesogenic substance.

In another advantageous embodiment, the displaying object further encompasses a reflection unit. This reflection unit can basically have whatever configuration desired. Such a reflection unit reflects the light incident upon the displaying object back to the entry side of the displaying object. As a result, the optical effects in the displaying object can then be viewed from the side from which the light is shined on the displaying object. In particular given structural limitations, this can yield significant advantages, for example when the displaying object is secured to a wall or a floor as a tile, and cannot be viewed from the back.

That is to say, given no reflection unit, the displaying object would then be viewed in transmission, wherein the light would be shined on the displaying object from the one side of the display object, and the optical effects in the displaying object would be viewed from the other side of the displaying object. Such a displaying object is transparent with respect to the used light, and is viewed in transmission.

The displaying object can be used both in transmission and in reflection, thereby enabling countless and varied applications in the object area or architecture area, for example use as transparent objects (e.g., window elements, panels, light tubes, light fixtures, animatable passive displays, etc.) or reflexive objects (e.g., façade elements, tile elements, panels, light fixtures, etc.) or combinations thereof.

In another advantageous embodiment, the displaying object further encompasses at least one flexural resonator, which can generate acoustic signals. As a result, the displaying object can be used not just for purposes of visualization, but also intonation. The use of flexural resonators eliminates the need for a separate loudspeaker, thereby yielding an exceedingly compact structural design.

In another advantageous embodiment, the flexural resonator is provided in or on the object retarder unit. As a consequence, the compact structural design can be improved yet again, and when the flexural resonator is integrated into the object retarder unit, even maximized.

According to the invention, the problems mentioned at the outset are further resolved with a method for modulating and displaying optical effects using a device of the kind described above, in which the composition of light is modulated with respect to polarization and/or retardance in the modulation unit via exposure to energy, in particular in a time-dependent and/or location-dependent manner, and/or a piece of image information is reversibly or irreversibly impressed into the object retarder unit in the object retarder unit via exposure to energy and/or material transformation and/or structural change, in particular in a time-dependent and/or location-dependent manner, and wherein the modulation of light composition interacts with the image information in the object retarder unit, as a result of which optical effects are visualized by means of the output polarization unit.

With respect to the explanation of method claim 13, comprehensive reference will initially be made to the explanation given for system claim 1. In the method according to the invention, the light composition is initially modulated with respect to polarization and/or retardance in the modulation unit via exposure to energy in a time-dependent and/or location-dependent manner. This makes a first contribution toward changing the display of optical effects.

As an alternative to or in conjunction with the modulation, a second contribution toward changing the display of optical effects can be made via exposure to energy and/or material transformation in the object retarder unit, which makes it possible to reversibly or irreversibly impress a piece of image information into the object retarder unit in a time-dependent and/or location-dependent manner. This type of impressing process has already been described.

Finally, the modulation of light composition via the modulation unit then interacts with the reversible or irreversibly impressed image information in the object retarder unit, as a result of which optical effects are visualized by means of the output polarization unit.

Such an interaction can basically take any form desired, for example as a superposition by addition or subtraction.

In an advantageous embodiment of the method, the optical effects arising in the displaying object are made invisible by at least regionally canceling the polarization. The regional cancelation can here be brought about in basically wherever way desired. For example, the regional cancellation can take place in the input polarization unit or in the output polarization unit.

In another advantageous embodiment of the method, the polarization is cancelled by removing at least one polarization unit. As already described, the polarization can be at least temporarily cancelled by removing the input polarization unit and/or output polarization unit, for example, as a result of which the optical effects remain invisible.

In another advantageous embodiment of the method, at least one mesogenic substance or mesogenic unit, in particular liquid crystal, is exposed to the energy. In this regard, reference is made to the above description.

In another advantageous embodiment of the method, control of the exposure to energy is correspondent to a base signal. The base signal can be selected and embodied in basically any way desired. For example, the latter can involve a modulated signal, e.g., an audio signal, but also a sensor signal, e.g., a pressure sensor, or originate from a signal generator.

This makes it possible to bring about a correspondence between the optical effects and, for example, interactions, e.g., human movements via pressure sensors, as well as intonations, e.g., via acoustic signals. As a result, a connection between two senses is established for the viewer, for example hearing/sight or sight/feeling, which can lead to special experiences.

In another advantageous embodiment of the method, the light from the lighting device incident on the displaying object passes through the displaying object, so that it can be viewed on the other side of the displaying object. This represents the transmissive option described above for viewing a transparent displaying object.

In another advantageous embodiment of the method, the light from the lighting device incident on the displaying object is reflected within the displaying object, so that it can be viewed on the entry side of the displaying object. The reflection unit described above is required for this purpose in order to guide the light back to the entry side of the displaying object, as described above.

BRIEF DESCRIPTION OF THE DRAWINGS

Several embodiments are shown by example in the drawings.

Shown on:

FIG. 1 shows an arrangement of a displaying object with a lighting device as well as the internal layout of the displaying object;

FIG. 4a shows a schematic layout of a modulation unit;

FIG. 6a shows an exemplary application of the invention given architecture elements with reflexive displaying objects;

FIG. 6b shows an exemplary application of the invention given architecture elements with transmissive displaying objects;

DETAILED DESCRIPTION OF THE EXAMPLE EMBODIMENTS

Figure 3:
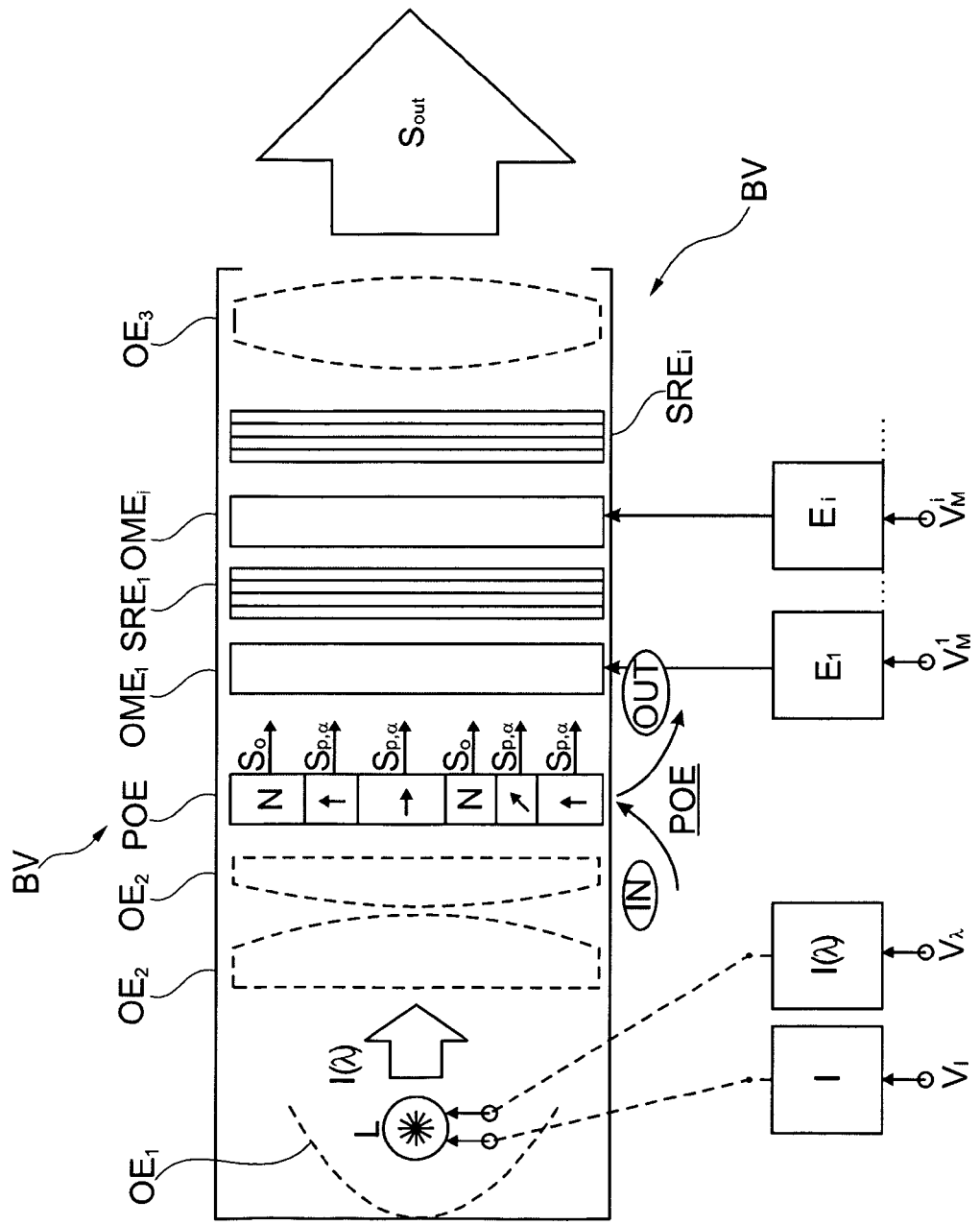
FIG. 3 shows a schematic layout of a lighting device.

FIG. 1 presents a schematic view of an exemplary embodiment of the invention that exhibits a lighting device (BV) depicted in detail on FIG. 3 having a respectively predetermined number of inputs for the control signals Vs, which can be used to correspondingly actuate an optical modulation element (modulation unit, OME) contained in the BV (according to FIG. 3). Proceeding from the By, the directly rear projected output beam (Sout) hits a displaying object (DO), which in this case is designed as a translucent displaying object (TDO), and thereby generates a corresponding luminous field (LF), which after passing through the TDO contains a corresponding piece of image information (BI) that the viewer (B) can perceive, and which can be modulated or impressed according to the control signals Vs.

FIG. 1 also shows a schematic cross section through such a TDO with a corresponding layer structure, wherein the light beam initially passes through a transparent protective layer (SS), and then runs through at least one optically anisotropic layer, which acts as a polarization optical image element (object retarder unit, POB), exhibits a respective latent piece of image information in the form of an image-addressable optical path difference Γi (x, y), and can optionally also be provided with a transparent, optically isotropic filler layer (FS) with a suitable optical refraction index. A predetermined number of correspondingly configured POB's is followed by a polarizing element (output polarization unit, PE), which in this case acts as an analyzer. One or more transparent protective layers (SS) can comprise the termination.

Figure 2:
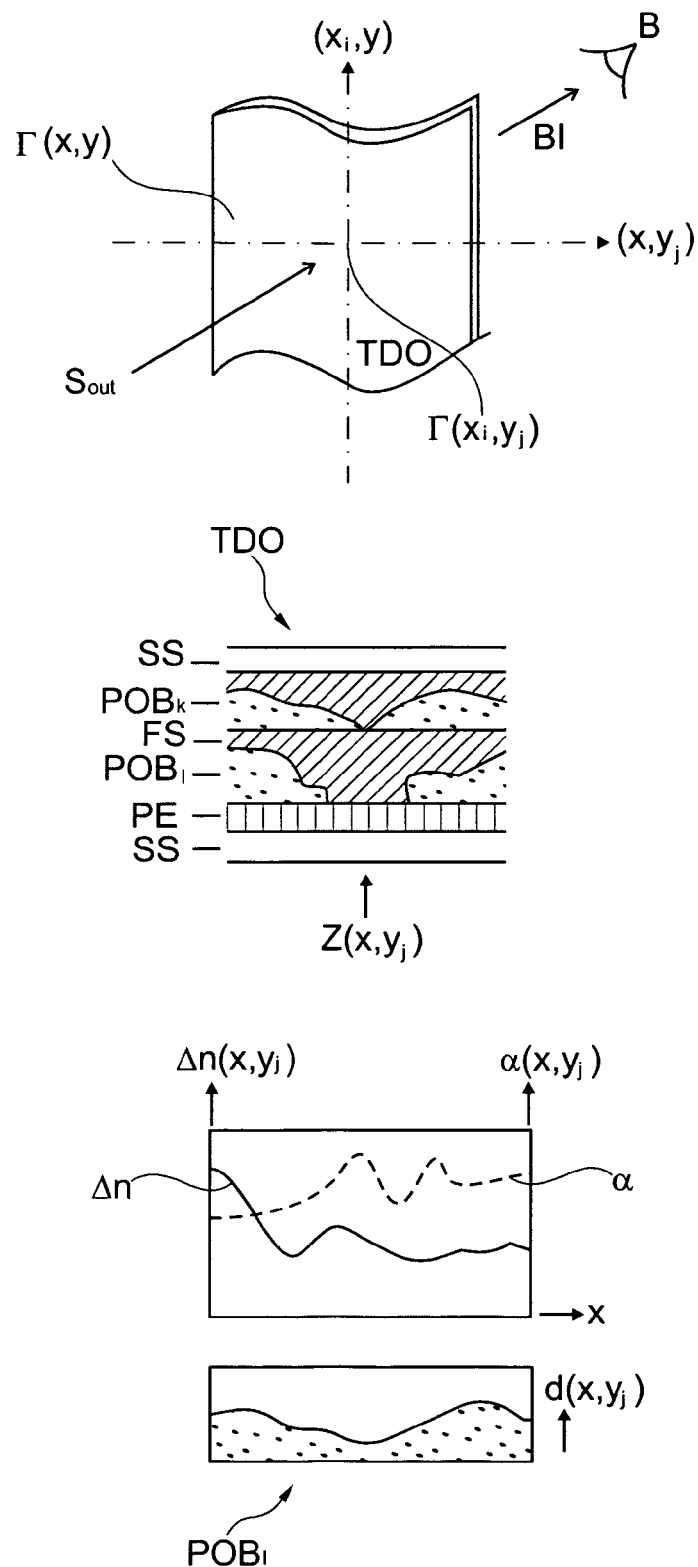
FIG. 2 shows another internal layout of a displaying object.

In this special case, the transmissive displaying object TDO described in this exemplary embodiment exhibits two different polarization optical image elements POBk, POB1 layered one behind the other, with correspondingly designed latent motifs impressed in the form of the respective locally addressable optical path differences Fi (x, y) and Γj (x, y). FIG. 2 once again exemplarily depicts the path of light through a TDO, which can be configured as a not necessarily planar element with a freely selectable shape and corresponding dimensions. FIG. 2 additionally presents a schematic diagram showing a section through a TDO (z-direction, y=const, x=variable), as well as a layer thickness profile d(x,yj) of a polarization optical image element POBk, along with the corresponding graphs for the respective layer thicknesses d(x,yj) that optically interact individually or together in terms of image concept and are structured accordingly image-wise, for the optical anisotropy $\Delta n(x,yj)$ and orientation $\alpha(x,yj)$.

The schematic drawing on FIG. 3 presents an exemplary embodiment of a lighting device that can advantageously be given a modular design. Proceeding from a light source L, which sends out light with a specific, preferred spectral emission $I(\lambda)$, and wherein means are provided with which the light intensity can be correspondingly varied by means of a control signal VI. In addition, other known means (e.g., spectral mixing of different light sources, spectral filter combinations, etc.) can be used to also vary the spectral emission via corresponding control signals VX in the desired manner. Depending on the application, the light sources can include conventional lamps, such as incandescent lamps, halogen lamps, metal halide lamps, xenon lamps, arc lamps, fluorescent lamps, metal vapor lamps, LED systems, and OLED, to name but a few. In order to visualize the latent image information within the respective displaying object, a polarization optical element (input polarization unit, POE) is incorporated in the optical path, wherein corresponding means (POE-IN) are provided for this purpose, which also make it possible to optionally remove the POE from the optical path once again (POE-OUT), so that the image information as well as the related optical effects can again be made entirely invisible at the discretion of the user.

Each incorporated POE can thus be individually configured, wherein all POE can be interchanged as desired, thereby yielding a respective specifically desired composition of all partial beams or luminous field areas produced by the POE, which can here basically be non-polarized or correspondingly polarized, wherein the respectively established polarized regions within the POE are additionally distinguished by their related polarization directions. As a consequence, a respective POE exhibits a specific number of mutually delineated and respectively defined local domains or corresponding field areas, which perform two fundamentally different optical functions. Those field areas labeled as neutral domains and symbolized with (N; So) according to FIG. 3 are characterized in that the exiting light within these areas is exclusively non-polarized. On the other hand, the field areas within a POE labeled as polarizing domains (symbolized by (↑; Sp, α) on FIG. 3) act as respective correspondingly localized and regionally delineated input polarizers each having a predetermined polarization direction α, and here are used for the resultantly induced locally containable polarizing visualization of the aforesaid optical effects within a respective luminous field of the displaying object DO, while the neutral domains serve to intentionally ensure that no visible optical effects appear on the luminous field areas distinguished in this way in conjunction with the respective DO. The polarization domains can be realized with all commonly used polarizer elements, which are designed and situated to reflect the respectively desired shapes and arrangements. In the simplest case, commercially available polarizer films can be used for this purpose (e.g., from Polatech, Nino Denko, Schott, 3M), which are arranged in the manner desired as correspondingly shaped segments, and also correspondingly aligned according to the respectively preferred polarization direction (polarization angle α). Also conceivable here are polarizer elements with a respective individually designed direction gradient field with respect to the polarization angle, wherein either discrete field areas with a uniform polarization direction and/or continuously progressing directional gradients can arise. In addition, means can be provided with which the respective polarization angles can be turned within specific domains. In cases where conventional absorbing polarization films are to be used, the light transmission relative to the polarizing domains is hence significantly diminished in comparison to the practically unimpaired neutral domains, as a result of which corresponding brightness differences between the related luminous field areas come about in the DO. If necessary, the light can also be weakened to a specific extent while passing through the neutral domains, so that practically no visible differences in brightness can be discerned any longer between the non-polarized light exiting the neutral domains and the polarized light emanating from the polarized domains. As a consequence, such neutral domains adjusted to the polarization domains in terms of brightness exhibit the corresponding field areas with the additional optical function of a neutral filter. A respective suitable optical transmission must here be selected in such a way that the light weakens to the same extent as possible as in the polarizing domains.

In the simplest case, conventional neutral filters with a corresponding optical density can be used for this purpose as the film material, and be correspondingly applied to a POE in conjunction with the polarization films.

According to FIG. 3, at least two additional optical functional elements are situated downstream in the optical path or beam path after the polarization optical element POE, in the respectively preferred number, arrangement and combination. These are so-called optical modulator elements (OME) on the one hand, and so-called structured retarder elements (retarder unit, SRE) on the other, the function of which was already described previously. As a consequence, the OMEi serve as light modulators for purposes of image modulation in the aforesaid DO, wherein light modulation is initiated on the respective OME via the corresponding exposure to energy Ei. The specified exposure to energy can then be actuated with the help of the control signals VMi. However, a relevant light modulation selectively acts exclusively on the polarized beam segments or polarized luminous field areas, while the non-polarized beam segments or luminous field areas are not subject to any light modulation whatsoever, so that no optical effects or image modulation whatsoever can be observed at these locations within a respective luminous field that were established for this very purpose in conjunction with a displaying object DO. A lighting device can thus contain several OME in parallel and/or in series, which can be introduced into the optical path or again removed from it as requirements might dictate, in the respectively desired arrangement and at any time needed, for example in modular form. Since each respective individual OME can be individually actuated by the respective control signals VM, the targeted use of several control signals makes it possible to orchestrate extremely complex light modulations or image modulations as a result. Such OME can practically be used in particular in the form of electronically actuated LC cells (so-called ECB cells, electrically controllable birefringence), which are available on the market in different variants and models. So-called Tested Nematic Cells (TNC) of various manufacturers can preferably be used (e.g., Optrel, Optrec).

According to FIG. 3, even more so-called structured retarder elements SRE can be incorporated into the optical path of the BV to go along with the POE and OME, in whatever number and arrangement desired, and in the corresponding allocation to the related OME. Each of these previously described SRE can here consist of either a single layer, which thus possesses a predetermined, locally addressed retardance $\Gamma(x,y)$, or of several cascaded, layered structures, which each can exhibit an independent motif with respect to the optical path difference $\Gamma i(x,y)$, as well as specific, respectively preferred axial distances.

As already described above, the aforesaid optical function of the combined polarization optical system sterns from the light optical interaction between the respective spatially separated lighting devices BV complete with elements POE, OME and SRE on the one hand, and the respective displaying objects DO with their incorporated POB as well as the related, allocated analyzer PE on the other, wherein both the SRE within the BV and the POB within a DO are each distinguished by predetermined optical path differences correspondingly structured in terms of image. As a consequence, the optical effects respectively visualized first in a respective DO are as a whole determined by the two different as well as spatially and functionally separate contributions, specifically in such a way that the first portion arises while the beam of light within the BV passes through the POE and a specific number of correspondingly configured SRE in conjunction with the respectively allocated OME, and the second portion comes about after a corresponding air gap or another transparent and isotropic medium only while the beam of light continues to pass through the respective POB within the DO, thereby yielding a resultant effective optical path difference that ends up determining the image, and is put together on a case-by-case basis by either adding or subtracting the path differences relative to the respective individual local portions. The respective piece of image information BI currently appearing in conjunction with the DO and the related color palette also [depends] on the respectively prevailing local polarization state, the axial direction and the light entry angle, so that these parameters can additionally be varied as desired from the BV. This spatial and functional separation of the BV from the respective DO is hence associated with a series of advantages. On the one hand, the light quality of the output beam Sout emanating from the BY remains practically unchanged even when connecting or replacing the transparent SRE and/or the POE and/or the OME, as well as under any modulation conditions, since all optical effects are only made selectively visible with the help of the respective polarizing element PE, and exclusively just when correlated and interacting in terms of light optics with a correspondingly specified DO, as well as at the corresponding luminous field areas established for this purpose. As a result, this functional separation imparts all active functions for image modification and image modulation to the BY, while their light optical effects on the light emitted by the BY always remain invisible.

The optical effects that respectively result from separate portions are visualized by means of the aforesaid DO, which are primarily configured as passive optical elements. The purpose behind spatially and functionally separating the SRE and OME from the displaying objects, which are most frequently immovably installed or largely unchangeable by predetermined latent image motifs of the POB, has to do with the application-related advantage that only individual, easily accessible optical components that are located solely within the lighting device BV and additionally exhibit small dimensions can be easily changed or replaced (wherein a plurality of different and correspondingly ready-made SRE can be used, for example in a changer device), as a result of which the optical effects in the DO can be modified and varied at any time, but without having to modify the DO itself. Therefore, it is incumbent upon the user, by correspondingly selecting and arranging the SRE and respectively allocating the latter to the respective OME, to freely shape the respectively desired image motifs along with their related color palettes in conjunction with corresponding DO.

FIG. 3 also shows the option of providing a respective BV with additional optical elements OE, which can be used for purposes of corresponding light guidance, targeted light beam influencing (bundling, deflection, etc.), defined luminous field projection or optical imaging. To this end, the BV can correspondingly incorporate the usual optical elements in the beam path, for example optical mirrors (OE1) and/or condenser lenses (OE2) and/or lenses (OE3), among others.

One exemplary embodiment of the invention contains an optical modulator element OME or an actively actuatable structured retarder element SRE.

The example to be illustrated relates to a case in which the aforesaid energy to which a correspondingly designed liquid crystal layer or LC cell is to be exposed takes the form of acoustic energies generated by corresponding applicators that can be activated via respective control signals, referred to below as an acousto-optical modulator element (ROME), which produces either one defined acoustic field or several reciprocally interfering acoustic fields or ultrasonic fields in a liquid crystal layer or a corresponding lumen. It is generally known that specific acousto-optical effects can be generated, for example in liquid crystals (Chatri Sripaipan et al., Physical Review, Vol. 15, No. 3, March 1977), in particular that the respective LC layer here exhibits birefringent properties when correspondingly exposed to US waves, wherein the LC each assume specific orientations. As a consequence, this leads to sound-induced and specifically adjustable or dynamically actuatable optically anisotropic pattern formations within the LC elements. Therefore, the acousto-optically induced phase structures can be used either as OME or as actively actuatable SRE, wherein the respective dynamic structure-forming optical effects that can be specifically excited in an acousto-optical manner can also be dynamically modulated via corresponding control signals. The applicators can consist of all electrical sound transducers or ultrasound transducers suitable for this purpose, wherein the respective acoustic fields can be correspondingly coupled into the LC layer using known means and coupling media.

One or several so-called photo-acoustic applicators can also be used on correspondingly established local areas of the LC layer. So-called photo-acoustic effects are here used in a respective LC layer in such a way as to have a correspondingly targeted irradiation take place on the LC layer via a related and respectively correspondingly modulated radiation intensity with the respective frequency in order to excite acoustic waves of a respectively desired frequency. The respectively desired radiation can also be applied in a contactless manner using one or more external and correspondingly modulatable radiators. It can further be advantageous for the electromagnetic radiation for purposes of photo-acoustic excitation to here lie outside the visible spectral range (e.g., IR radiation, microwave radiation, UV radiation, to name but a few). As a consequence, a corresponding radiator combination and beam guidance can be used to also suitably expose the respective LC field, without any visible influence being exerted on the light Sout emanating from the BV in the process. Experts in this field are aware of relevant procedures that permit a corresponding photo-acoustic excitation of LC layers, which in turn make it possible to subsequently generate the aforesaid acousto-optical effects.

FIG. 4A presents a special exemplary embodiment of an AOME in the form of an LC-element exposed to so-called acoustic surface waves as a schematic diagram.

In this device, the acousto-optical principle is used for the targeted generation and modulation of structure-forming optical phenomena with birefringent properties, wherein the AOME are now each incorporated into the optical path within a lighting device BV instead of the OME or SRE.

FIG. 4A sketches the principle of an AOME, wherein an interdigital transducer (interdigital transducer IDT) is used to generate acoustic surface waves OFW in an LC layer (LC) on a piezoelectric substrate PS, which lead to the aforesaid acousto-optical effects within the LC. The OFW can be either correspondingly weakened by means of an absorber (so-called acoustic well) or, if necessary, correspondingly reflected by means of a reflector R, e.g., so as to thereby generate standing acoustic wave fields.

The acoustic surface waves OFW are generated by the signal Si with a suitable base frequency (e.g., in the MHz range) using corresponding interdigital transducers (interdigital transducer, IDT) on a piezoelectric carrier material (PS) that is translucent given a transmissive application and light-reflecting given a reflexive application. The liquid crystal layer (LC) with a suitable layer thickness (in the micrometer range) applied to the carrier PS can be pre-oriented using known means (e.g., surfactants or orientation layers) as stipulated by the user, so that the LC layer is distinguished by a respectively preferred structured optical anisotropy, wherein the light emanating from the light source (L) and correspondingly polarized (Pol.) can be correspondingly modulated in terms of the optically anisotropic structures that were excited by the respective IDT and can be controlled by the signal Si. The signal Si used to excite and control pattern formation is initially generated by an HF generator with a variable amplitude and frequency. A downstream frequency modulator (FM MOD) is used to generate a frequency-modulated signal that can be modulated via the low-frequency control signal SS1 by a respectively predetermined base frequency, e.g., ranging from 500 kHz to 10 Mhz. The respective selection of the base frequency as well as the frequency swing arises from the respective wavelengths of the acoustic wave fields to be respectively induced, and again depends on the application-specific stipulations, wherein the related acoustic frequency or wavelength determines the respectively desired modes of pattern formation in terms of a targeted and dynamically controllable location frequency variation of the respective birefringent pattern domains (e.g., lattice constant of the phase lattice). Downstream amplitude modulation (AM MOD) allows an additional low-frequency control signal to also specifically activate the applied acoustic intensity, wherein the respectively preferred acoustic intensities as well as the degree of modulation are again determined by the application-specific stipulations for achieving the desired acousto-optical effects.

Figure 4B:
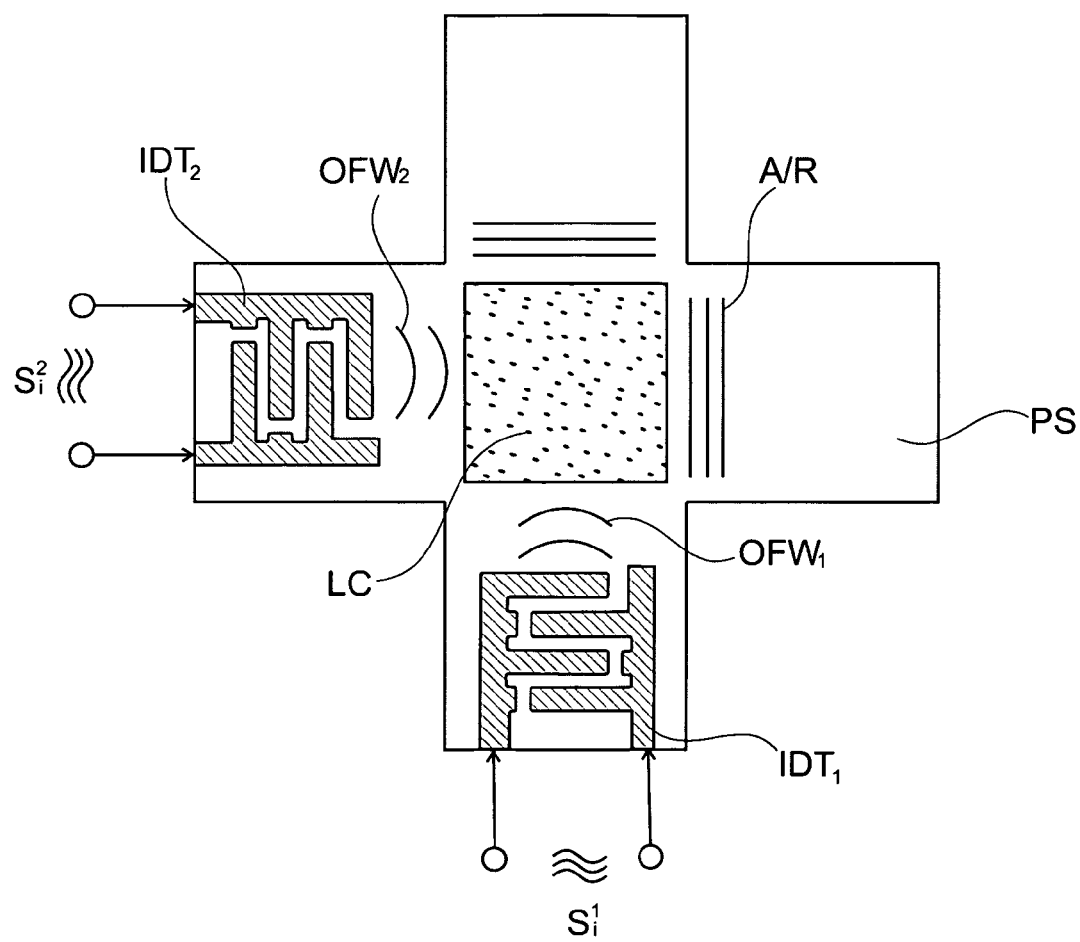
FIG. 4b shows another layout of a modulation unit.

FIG. 4B specifies the principle for a special exemplary embodiment of an AOME, which exhibits two interdigital transducers IDT1; IDT2 on a substrate PS.

The advantage to this exemplary application lies in the fact that two acoustic wave fields interfere with each other within the LC layer in this case, so that the signals Si,1 and Si,2 can be used to enable a targeted control of the respectively resulting interference field, and hence the resultantly arising local effects on the optically anisotropic structure formation in the corresponding LC domains. For example, subjecting the two acoustic intensities to complementary dynamic control via the two related amplitude modulators AM MOD makes it possible to specifically vary the location correlations for the local interference vectors of the two-dimensional acoustic field, and hence also the optical effects in a location-dependent manner as well, or to achieve a pattern formation with a corresponding dynamic for the excitation locations (excitation location dynamic). In addition, the pattern-generating acousto-optical determinants can also be influenced in a stationary or dynamic way in terms of the location frequency-specific pattern formation by means of the respective sound frequencies that can be correlated with each other in the desired manner as well as their frequency modulations used to actuate the two respective IDT (location frequency dynamic). As a consequence, extremely complex pattern formation processes and optical effects can be realized based on the respective intention of the user via the corresponding combination and correlation of the respective HF generators, amplitude modulations and frequency modulations implemented in this regard. Therefore, it is up to the user to in so doing generate and use additional embodiments and future variants of the AOME based upon the instruction explicitly or implicitly contained in this publication. It is also conceivable in this conjunction that the AOME be configured using a larger number of photo-acoustic applicators or various types of electro-acoustic transducers or combinations thereof.

FIG. 5A to 5E show five different embodiment variants involving a direct or indirect illumination via the front projection or rear projection of the light emanating from the lighting device BV, which hits a related displaying object DO, and optionally is designed with a translucent (TDO) or light-reflecting (RDO) composition.

Figure 5A:
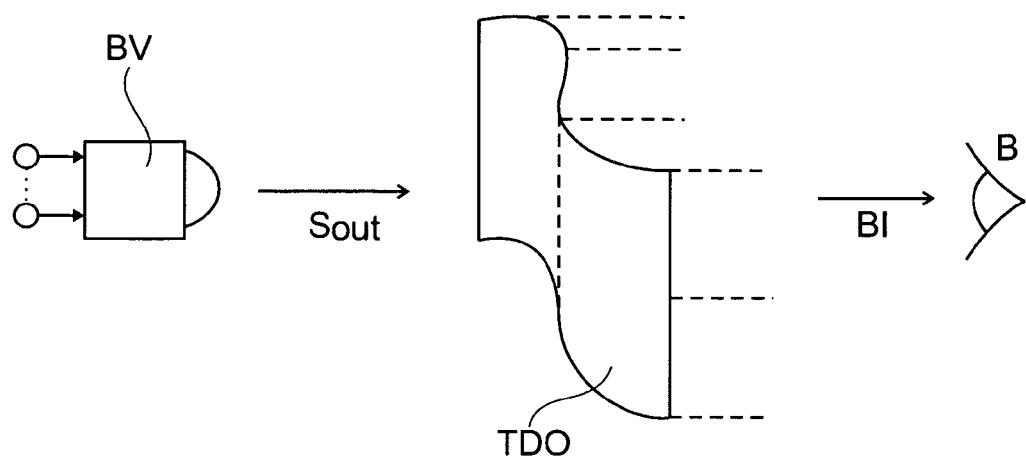
FIG. 5a shows a transmissive displaying object with direct rear projection.

FIG. 5A provides an exemplary schematic view of a translucent (transmissive) displaying object TDO, which in terms of its structural design can possess a corresponding internal structure, e.g., according to FIG. 1 and FIG. 2, wherein, among other things, several correspondingly layered polarization optical elements POB can be incorporated, which each carry a latent, individually configured piece of image information. The TDO can additionally be incorporated in any number, dimensions and whatever desired shape variants (e.g., as a laminar or solid, planar or curved structure, and also as a hollow body or solid body) into the luminous field emanating from the lighting device BV in any preferred spatial position, and also be moved in the respective luminous field. As a result, an output beam Sout emanating from the BV shines directly through the TDO, so that a viewer B located on the rear side of the TDO can perceive the image information BI generated in the TDO in conjunction with the respectively illuminated fields only in the event of a polarizing visualization. By contrast, no visible image information will come about in the also intended case in which the output beam is optionally non-polarized as a whole given the means contained in the BV, so that no related optical effects whatsoever are observed either, wherein the entire TDO appears completely transparent (so-called neutral mode).

Figure 5B:
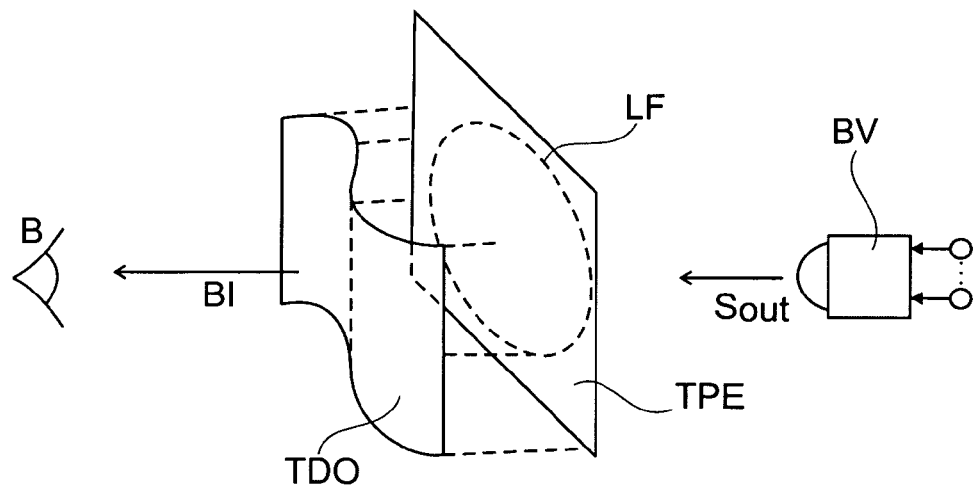
FIG. 5b shows another transmissive displaying object with indirect rear projection.

FIG. 5B shows an exemplary embodiment variant of an indirect transmissive rear projection with the use of an also translucent TDO. As opposed to 5A, this arrangement exhibits a so-called translucide projection element TPE additionally introduced between the BV and TDO, wherein rear projection yields a corresponding luminous field that serves as a related background illumination for each downstream TDO, wherein the TPE, similarly to the TDO, can also be designed with a freely accessible shape and size, and can preferably be correspondingly adjusted to the conditions predetermined by the respectively used TDO. However, in order to ensure its function, such a TPE must satisfy the essential condition that the respective material used in realizing the TPE is distinguished in particular by its polarization-conserving properties, so that the respective correspondingly polarized light passing through the TPE via rear projection as well as the respective background luminous field for the downstream TDO retains its respective polarization state largely unchanged. Otherwise, the TPE can be realized using all materials that exhibit the respectively desired characteristic in terms of translucence (transmission and scattering) and light guidance (projection angle, viewing angle). The aforesaid image information BI or optical effects can then be viewed by the viewer B on the front side of the TDO in front of the respective background luminous field LF. Based on amassed experience, for example, optically opaque rear projection film materials from LogoFilm can advantageously be successfully used as the TPE materials, since they are sufficiently polarization-conserving, and, because of their related characteristic, also enable a very high-contrast observation of the optical effects in the TDO as well as over a wide viewing angle, largely uninfluenced by ambient stray light, even under daylight conditions. After the BV has switched from the polarizing visualization into the neutral mode, the TDO again appears completely transparent in front of a background homogeneously illuminated primarily with white light.

Figure 5C:
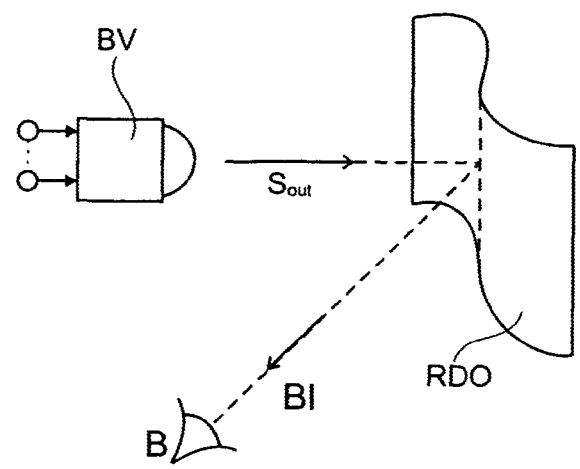
FIG. 5c shows a reflexive displaying object with direct front projection.

FIG. 5C provides a schematic view of an exemplary embodiment for a case involving the direct front projection on a reflexive displaying object RDO. In this embodiment variant, the light Sout emanating from the BV hits a displaying object in a reflecting arrangement RDO, wherein the internal structure can among other things contain at least one or more correspondingly designed and correspondingly parallel and/or serially layered POB, which each possess a latent piece of image information. As a consequence, the light radiated by means of the BV passes through all related POB, and finally hits an optically correspondingly coupled polarizing element PE, which in this case serves as a reflecting analyzer, wherein the light on the analyzer surface is correspondingly reflected according to the polarization direction of the analyzer, so that it contains the image information BI that in the case at hand can be subjected to a polarizing visualization by the viewer B. If the state is optionally operated in the neutral mode, absolutely no optical effects appear in the RDO again, so that exclusively the advantageously homogeneous and diffusely reflecting surface of the PE shines through the upstream transparent layers. Based on the acquired knowledge, the popular diffusely reflecting and simultaneously polarizing film materials of various manufacturers (e.g., 3M, Vikuiti, Polatech, Nitto Denko, etc.) can advantageously be used as the respective reflective PE, which are distinguished in a specific manner by both their polarizing and their reflecting characteristics. These film materials are also easy to laminate onto the related optical elements, so that the aforesaid optical effects can be observed at a high level of brightness and contrast with brilliant color reproduction when viewed from the front and during front projection over a wide range of projection angles and viewing angles, while also being sufficiently insensitive to the ambient stray light.

Figure 5D:
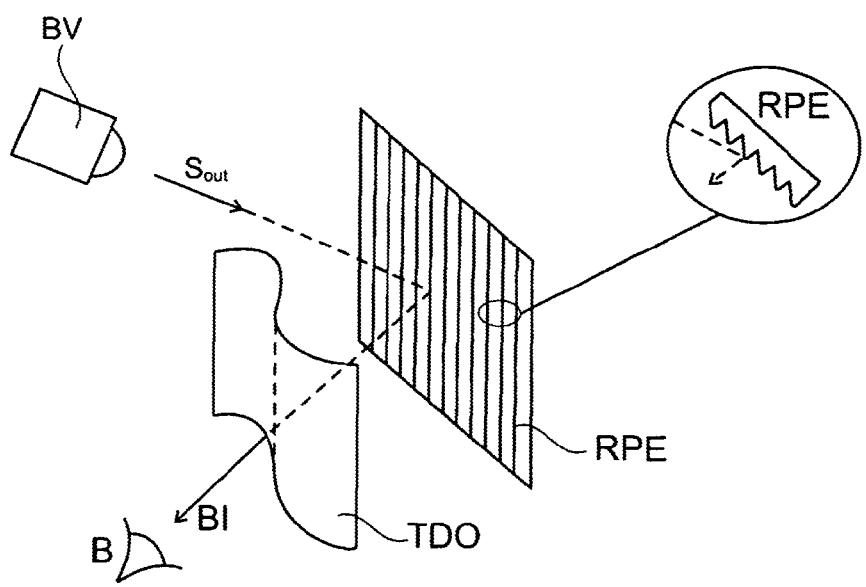
FIG. 5d shows another transmissive displaying object with redirected rear projection.

FIG. 5D presents a schematic drawing showing another variant in the form of an indirect and reflexive rear projection with the use of at least one translucent transmissive displaying object TDO in combination with at least one so-called reflexive projection element RPE. A beam of light Sout emanating from the lighting device BV here initially hits a correspondingly configured RPE at a suitable projection angle. This RPE here acts as a polarization-conserving, correspondingly arranged light reflector that is provided with a specific surface and exhibits a respectively desired reflection characteristic, so that the light correspondingly reflected by the RPE passes through a respective TDO in the intended manner, wherein the visible image information BI exiting the TDO can be perceived by the viewer B. Depending on the selected projection angle of the radiated light in conjunction with the ranges of reflection angles or viewing angles respectively brought about by the respective reflection characteristic of the RPE, a specific spatial distance is consequently required between the RPE and TDO. The reflector luminous field emanating from the RPE thus again serves as a background luminous field for observing the aforesaid optical effects when looking through a respective TDO. In order to satisfy the polarization-conserving condition, the RPE can be primarily provided with metallic surfaces. With the objective of achieving a desired reflection characteristic intended to reflect and/or more or less diffusely scatter the radiated light according to a specific preferred direction, the related surface can also be furnished with a specific surface finish and surface structure (e.g., specific reflexive and/or scattering relief structures, micro-prism structures, lattice structures, to name but a few). In this regard, FIG. 5D shows the detailed section for an exemplary embodiment for purposes of light guidance via directed reflection on a correspondingly designed surface structure, to which end correspondingly lined semi-prismatic micro-reliefs are arranged in such a way that light radiated at a specific, shallow angle of incidence is reflected primarily perpendicular to the RPE surface. Aside from the reflection, the additionally matted metallic surface also imparts a specific portion of scatter to this surface, making it possible to improve even further the visibility of optical effects as well as the useable range of viewing angles.

RPE can also be manufactured with a plurality of marketable plastic film materials, e.g., those used for purposes of light guidance in LCD screens or in various light fixture constructions (e.g., 3M; Vikuiti, etc.). In the event these popular film materials should lack only the polarization-conserving properties required here, these films can additionally even be correspondingly coated with a metallic surface. Likewise, metallic materials can also be machined using known methods in such a way as to thereby fabricate a desired structure and surface finish.

Figure 5E:
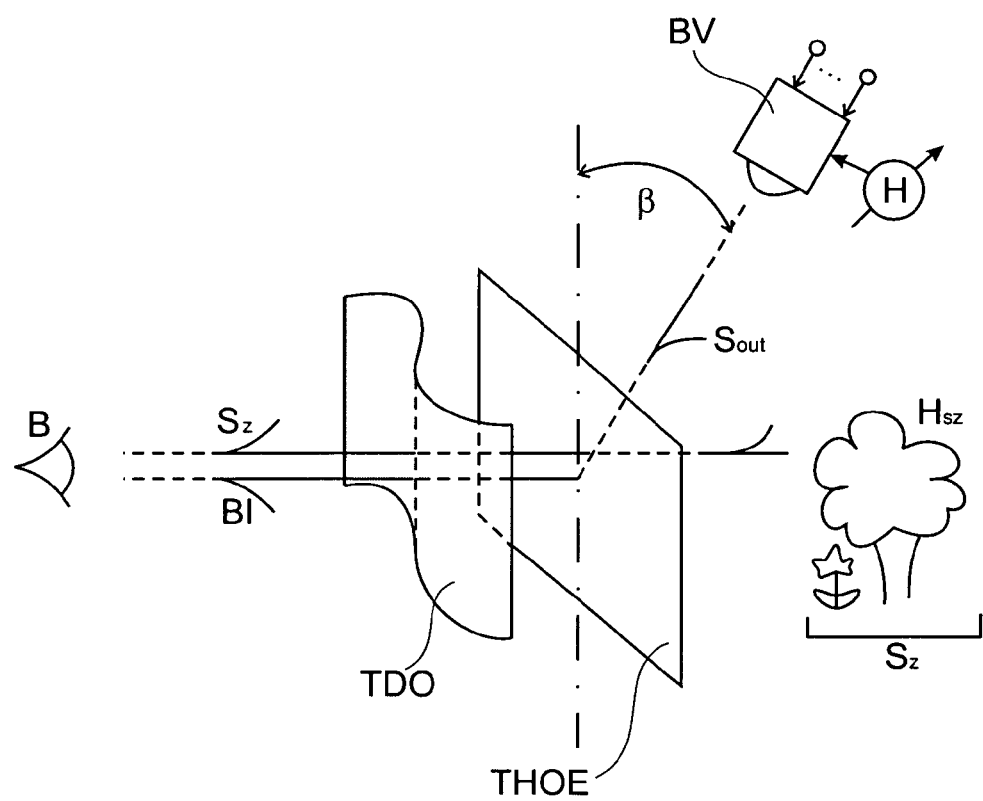
FIG. 5e shows another transmissive displaying object with indirect rear projection via a transparent holographic optical element (THO)

Another embodiment variant is schematically depicted on FIG. 5E, which as opposed to the previously shown versions 5A to 5D now incorporates a visual overlap of two different image sources (so-called overlay function). For example, this additional optical function makes it possible to view a respective real scene Sz or a virtual scene based on other related images from any image media (e.g., display, video or film projection, etc.) through the two respectively transparent optical elements TDO and THOE situated one behind the other, giving rise to the special capability of optically overlapping the respective real scene here observed simultaneously with the aforesaid optical effects, which if needed are generated via the BV within the TDO. In terms of its optical function, the transmissive holographic element THOE correspondingly arranged so as to be connected with the TDO is generally distinguished by the fact that this element, when viewed from the front, serves on the one hand as a practically transparent window for a visual scene lying behind on the one hand, and on the other can be overlapped in a specific manner with this respectively viewed scene by means of a rear projection additionally oriented toward the THOE via the BV at a respectively defined angle of incidence β. As a consequence, the respective extent of the optical overlap depends on the respective correlation between the related prevailing brightness levels of the two portions. For this reason, the respective extent of overlap can be individually tailored as desired to the respective brightness Hsz of the scene Sz via the brightness H on the part of the BV in a respectively reciprocal way. With respect to the two special cases in which (a) either the scene Sz remains in the dark or (b) no related rear projection takes place (i.e., H=0), only the projection in case (a) or the scene itself in case (b) appear when looking through the THOE.

Such THOE based on the application of holographic lattices are available as so-called holographic optical projection discs (HOPS) from SAX3D. The advantage to using these optically transparent holographic elements lies in the fact that these elements exhibit the required polarization-conserving property as required by principle on the one hand, and that the aforesaid optical effects that arise during polarizing visualization are barely influenced by the usually non-polarized ambient or stray light on the other, thereby enabling an extremely high-contrast and brilliant display, even in an environment with a high level of brightness. Another advantage to the respective applications also stems from the fact that they now permit an excellent reproduction of the aforesaid optical effects, even under what are usually extremely unfavorable conditions for such a projection, e.g., even when exposed to bright daylight or given a headlight aimed direction at the THOE. The latter advantage stems primarily from the fact that the output beam Sout exiting the BV is projected on the rear side of the THOE only at a respective, precisely defined and limited angle of incidence (3, and then, using the related, specifically configured holographic lattice structure of the THOE respectively tailored precisely for this angle, diverted perpendicular to its surface in the direction of the viewer B, thereby bringing about the visualization of the desired image information BI after passing through the downstream TDO. Since exclusively the projection beam Sout emanating from the BV is active in generating the aforesaid optical effects in conjunction with the respective TDO, all other light sources not originating from the BV thus usually detract considerably from the reproduction quality of the aforesaid optical effects. This disadvantage is largely avoided through the use of THOE by virtue of the fact that, in this special instance, any stray or ambient light incident at whatever other angle, which is also usually non-polarized, is neither scattered nor curved in any way whatsoever in the element itself, so that it shines through the transparent THOE. Because both the THOE and TDO are each transparent, and hence also exhibit practically no visible internal structure, both the image information BI arising from the TDO and the respective scene Sz appear to the viewer B in the form of a corresponding visual overlap during the polarizing visualization of the optical effects. By correspondingly adjusting the brightness of the projection light from the BV via the regulator H in respective relation to the brightness Hsz of the scene, the extent of the respectively arising optical overlap can be tailored in the desired manner. In cases where the scene Sz involves a real scene, the respective brightness Hsz can also be varied as desired by means of an additional and correspondingly dimmable light. In other instances, e.g., when a virtual scene is to be generated in place of a real scene based on a respective image projection or video projection on a related display or screen, the brightness Hsz can here also be correspondingly adjusted for the respectively used medium. As a result, additional optional impactful design possibilities can be created via the specific, dynamic control of the respective brightness levels H(t), Hsz(t) relative to each other, wherein, in addition to the respective aforesaid optical effects achievable thus far, this special embodiment variant can be used in this case to also dynamically vary the respective extent of transparency and respective contrast ratios during the respective staging process. In the case of the selected neutral mode, i.e., when projecting a light that emanates from the BV, and is hence entirely non-polarized, a related luminous field appears without any optical effects whatsoever, as described above, wherein the respective luminous field is optically superposed at correspondingly adjusted brightness levels (i.e., H of the light projection originating from the BV in conjunction with the Hsz of the scene Sz) in such a way as to resultantly give the viewer B the visual impression that is evoked when looking through a more or less opaque and illuminated disc. With respect to the two extreme cases (a) (H>>0; HSz=0) or (b) (H=0; HSz>>0), a completely opaque background luminous field becomes visible in (a) for the transparent TPO, not allowing any perusal of the respective scene Sz located behind the latter, while the two elements TPO and THOE both appear equally and completely transparent in (b), and permit a completely clear view of the scene Sz.

FIGS. 6A and 6B present a schematic view of another exemplary embodiment of the invention in the form of displaying objects that can act primarily as architecture elements, and can be used both as traversable floor tiles or floor coverings, as well as for wall panels or façade elements and the like. The tile elements depicted on FIG. 6A are correspondingly illuminated as displaying elements in a reflexive composition RDOi by the beam of light Sout, which emanates from an external lighting device BV, so that the viewer B can observe the generated optical effects within each of the RDOi. This variant corresponds to the principle shown on FIG. 5C. Each architecture element designed as an RDO thus contains a respective specific number of POB with correspondingly designed motifs. In addition, the respective RDO can be applied to a corresponding carrier material T, and the surface of the RDO can likewise also be provided with additional transparent layers SS, e.g., which act as a protective layer, or can incorporate correspondingly structured surface profiles or corresponding transparent color motifs or specific contrast levels.

FIG. 6B presents an exemplary embodiment involving the use of translucent architecture elements, which are each realized in the form of correspondingly designed TDO, wherein an indirect transmissive rear projection takes place according to the principle arrangement shown on FIG. 5B. In this case, a respective beam of light Sout is emitted from the related used lighting devices BVi . . . BVk, which either passes through an air layer LS or through a suitable transparent filler layer FS, so that a respective luminous field comes about on the ensuing translucent, transmissive projection element TPE, thereby serving as background illumination for all related integrated TDO. In like manner, the TDO can also be provided with additional layers SS, as in the case of FIG. 6A. During polarizing visualization, the aforesaid optical effects again appear in the respective architecture elements, while the latent image information remains invisible to the viewer B when the BV is switched over to the neutral mode.

Additional conceivable exemplary embodiments for architecture elements in either a reflexive or transmissive configuration can be realized in a variety of shapes and arrangements according to the principles described on FIG. 5A to FIG. 5E.

Figure 7:
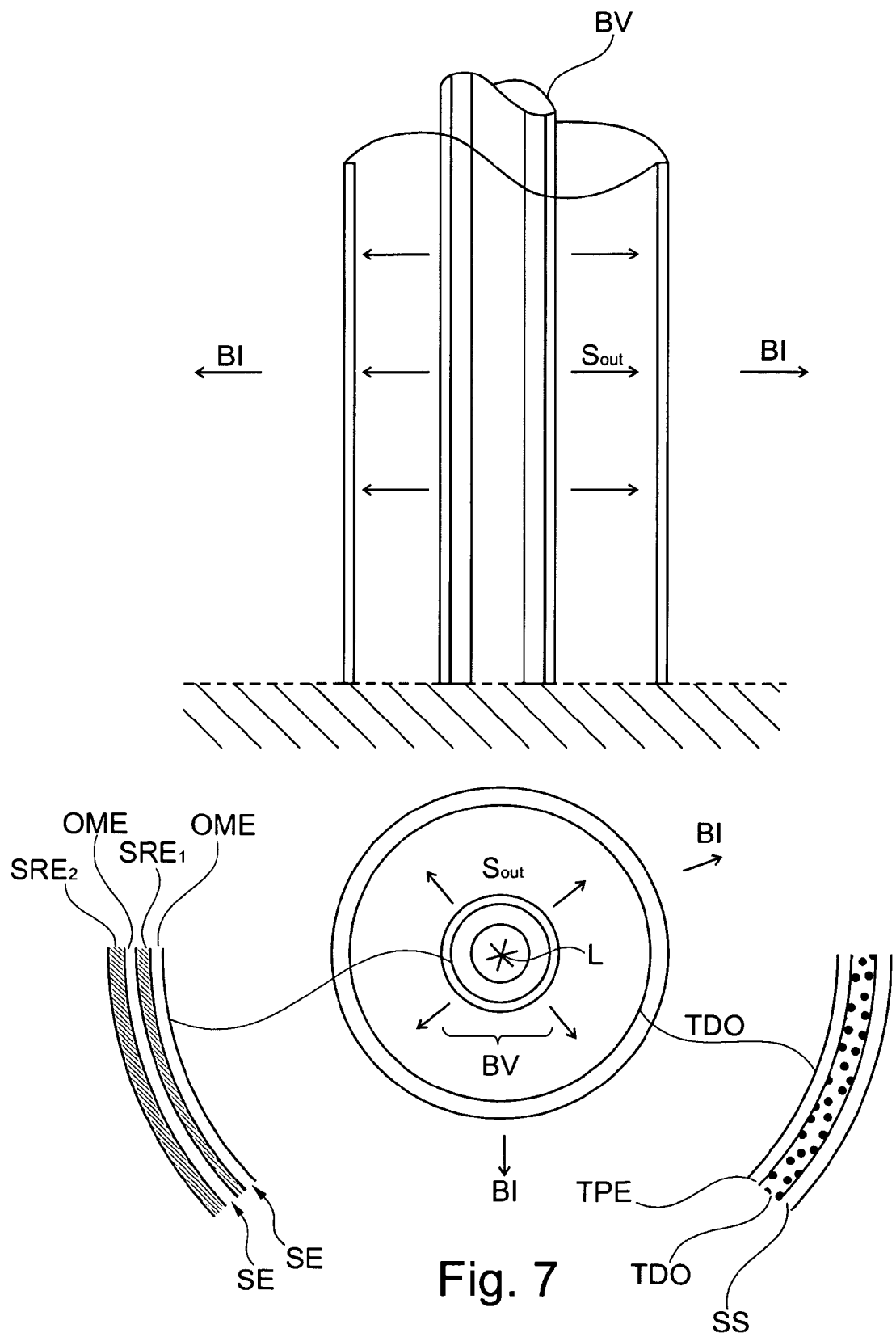
FIG. 7 shows an exemplary application of the invention in a tubular arrangement.

FIG. 7 presents an exemplary view of another architecture element, utility object or lighting element, which can be tubular in design, and among other things contains the respective BV and TDO in a coaxial, cylindrical arrangement. In this case, the principle of indirect, transmissive rear projection according to FIG. 5B is again realized in accordance with the present circumstances. The inner transparent tube element contains the lighting device BV, and emits the light Sout in a radial direction, which in turn generates a corresponding luminous field on the interior side of the outer cylindrical tube element in the TPE, and thus serves as background illumination for the immediately following coaxial, cylindrical TDO, wherein the respective image information 131 visible all around emanates from the exterior side of the TDO. The lighting device BV in turn contains a light source L, which is preferably located in the axial center, as well as the layered, cylindrically configured and respectively sequentially arranged POE, modulation elements OME and structured retarder elements SRE in the respectively desired number. All related OME are additionally activated by means of the respective control elements SE. The outer cylinder is hence in turn formed by a translucent and correspondingly layered structure, which proceeding from the interior side contains a transmissive projection element TPE followed immediately by a transmissive displaying object TDO along with corresponding additional transparent layers SS. For some applications, it may also be advantageous for the respective cylindrical tube element, which is designed as a TDO or encompasses one or several respective polarization optical image elements POB within a TDO, to be provided as an easily replaceable component, thereby making it easy to change out the respectively desired motifs (e.g., through the simple exchange of one or several POB designed as corresponding films).

Figure 8:
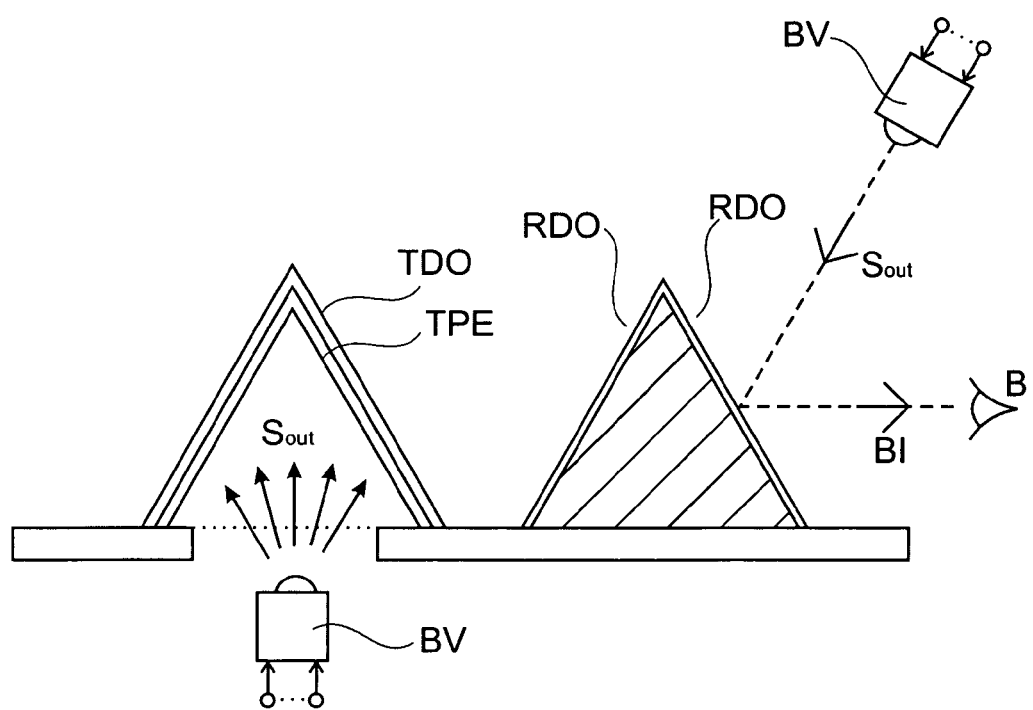
FIG. 8 shows an exemplary application of the invention in a pyramidal arrangement in two variants.

FIG. 8 depicts another two variants for implementing the invention based on the example of a pyramidal architecture element or utility object, on the one hand with a transmissive configuration and internal BV given indirect rear projection according to the principle on FIG. 5b, and on the other hand the same object in a reflexive configuration and with external BV given direct front projection according to the principle on FIG. 5C.

Figure 9:
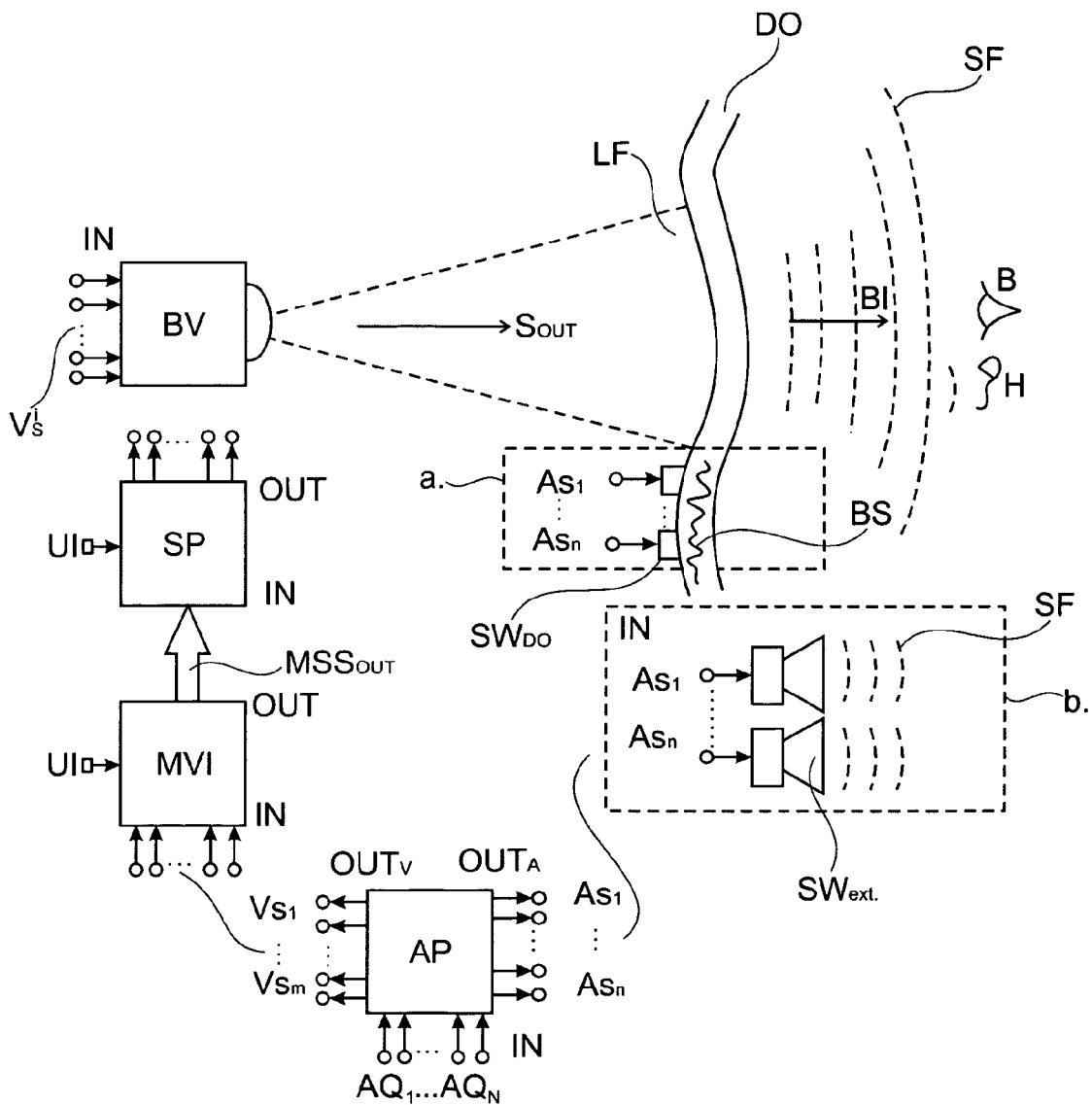
FIG. 9 shows an exemplary application of the invention for simultaneously reproducing audio signals together with the optical effects.

The exemplary embodiment on FIG. 9 relates to using the invention within the context of audiovisual media applications, in particular the expansion and combination of the respective polarization optical system with the help of corresponding devices and methods for the synchronous, real-time visualization of auditory phenomena or optical representation via the aforesaid displaying objects based on related derived and correspondingly parameterized acoustic features in conjunction with their simultaneous related acoustic reproduction.

Generally known in this connection are first and foremost computer-based systems and programs and/or multimedia systems (e.g., interactive video systems), which are used primarily for music visualization (so-called music visualizers) by means of corresponding computer graphics. As a rule, sound-based pictorial or graphic effects are generated in these cases, and correspondingly displayed on a screen or video projection in the form of animated computer graphics or video sequences. To this end, the users can also choose from corresponding interfaces and programs for incorporating visualization plug-ins (e.g., SoundJam, WinAmp, Geiss, Monkey, etc.), which can be installed in the respective computer systems. The disadvantage here is that such computer graphic visualizations most frequently exhibit a more or less direct and/or largely randomly allocated graphic conversion of audio data into correspondingly predetermined graphic objects or various types of superimpositions of graphic primary elements (e.g., points, lines, basic geometric forms, polygons, etc.), wherein specific and largely similar repetitive pattern variants with predominantly uniform and easily predictable stereotypical movements come about, which hence are hardly able to impart a reference to the respective recorded musical experience that is convincing to the senses. This is accompanied by the principle-related fact that the practically arising latency times for the graphic conversion of complex audio signals by means of conventional analysis algorithms and graphic processors are still too high to synchronously link the auditory and visual events under real-time conditions assuming a reasonable outlay with respect to modern computer technology. Another fundamental disadvantage to this method also stems from the fact that, given the laminar design of the indicating medium in the form of a screen or image projection, visualization must essentially be confined to two dimensions with a predetermined size, wherein a corresponding system-related pixel structure with just as limited a resolution is also unavoidable in all instances.

Other conventional methods and devices used in lighting design involve the control of light via audio signals, using a specific number and arrangement of corresponding color light sources, preferably applying the principle of additive color mixing, wherein such light installations and their illumination scenarios most often amount to nothing more than constantly repeating and stereotypical illustrative light effects. Another disadvantage to this photometric conversion is that only defined, largely monochromatic color surface areas appearing in respective rhythmic and/or continuous changeovers can be generated at any one time on a respectively illuminated object, without it being possible in the process to implement certain variations in structure or shape that are significant specifically with respect to music. As becomes evident from the above, the use of light installations based on light sources alone can thus not satisfy the complex requirements placed on the conversion of musical attributes into adequately visual display forms.

As opposed to the aforementioned known systems for music visualization with lighting devices or computer graphics, the claimed method in conjunction with the respective devices is based upon a fundamentally different kind of conceptual approach, which applies current and future available knowledge about the audiovisual and aesthetic or synaesthetic reception conditions in conjunction with related, correspondingly established theoretical and/or empirically derived concepts so as to achieve an adequate conversion of significant auditory and/or musical determinants into correspondingly suitable visual manifestations within three-dimensional displaying objects that can be shaped and dimensioned as desired by means of the claimed polarization optical system in connection with the music visualization interface MVI additionally implemented in the system. Various paths toward operationalizing the respective transformation and visualizing process with the application of different technical means can here basically be embarked upon, and also consistently updated as new scientific knowledge and aesthetic experience is gained.

In particular, not just the method for accomplishing audiovisual conversion is set apart from the conventional digital media in a pertinent and advantageous manner, so too is the very respective display medium used for this purpose. While computer graphic visualization programs are only able to generate and animate specific virtual graphic objects by means of corresponding graphics programs, wherein either a screen or corresponding image projection is used as the display medium for their two-dimensional optical display, visualization takes place through the utilization of polarization optical principles in conjunction with the material composition and optical material properties of a respective transluciding carrier medium, which in this case consists exclusively of passive optical elements, wherein these elements can also be designed in any way as three-dimensional displaying objects (DO) with a translucent (TDO) or light-reflecting (RDO) composition, and in whatever desired dimension and shape, and can additionally be arranged in corresponding ensembles however desired. Also different is the way in which the optical effects, which each carry a latent piece of image information, are themselves generated within the respective DO in a purely physical manner, wherein the latter can be generated in a respectively separate and individually configured way, and parametrically controlled or animated by means of an external lighting device in a light-optical manner, without having to use any image projection or corresponding screen for this purpose. Another peculiarity also involves the type of conversion of the music-specific determinants into a corresponding and above all adequate form of visual representation for the respectively prevailing auditory phenomena.

As shown on FIG. 9, several parallel audio signal sources AQ1 . . . AQn can here be used (e.g., any conventional audio devices, microphones, sound cards, to name but a few), which each are routed as input signals IN to a multichannel audio processor AP. This AP effects a corresponding signal preparation for purposes of acoustic reproduction on the one hand, so that the audio output signals OUT A (AS1 . . . ASn) can be routed to the corresponding sound transducers SW. Sound conversion can take place in two different ways (a, b): In case (a), the electro-acoustic transducers are coupled directly to a respective displaying object DO in such a way that these sound transducers (SWDO), e.g., as flat-panel loudspeakers, also utilize the DO used for visualization purposes so as to excite corresponding acoustic modes (distributed waves) in the DO via bending vibrations BS, which then generate an acoustic field SF emanating directly from the DO, so that the latter can be perceived by the listener H. (Corresponding electro-acoustic transducers for generating bending vibrations in flat-panel elements are manufactured by NXT, for example).

In case (b), the usual and externally positioned loudspeaker systems SW ext. can also be used for acoustic reproduction.

The AP also has corresponding functions in which the audio input signals AQ1 . . . AQn are subjected to electronic signal processing for purposes of adjustment to the system components intended for music visualization, and delivers the signals VS1 . . . VSm required to this end at the second output OUT v, which are initially routed to the respective input IN of the so-called music visualization interface MVI. A specific number of parallel signal tracks MSSout are then available at the output of the MVI, which contain specific and/or representative dynamic profiles of the respective time-line-related parameter strings P1(t), . . . Pi(t), . . . Pm(t) formed with the help of the MVI, and are provided for parametrically controlling the optical effects within a respective displaying object DO. The downstream signal processor SP is used to correspondingly select the respective desired signal tracks or data streams, and electronically process them in a specific manner with known analog or digital methods (e.g., DSP), making the latter suitable for correspondingly actuating the lighting device as exemplarily depicted on FIG. 3 via the related control signals Vs,i. The goal of the application is to allow the reproduced auditory events and phenomena visualized in the respective DO to each be instantaneously perceived on the one hand, and permit the recipient of the related audiovisual representation to alternately discern a sensory and/or meaningful correlation (audiovisual homology) between what was just heard and seen. The generally valid rules underlying the analogy experienced by the recipient in this conjunction between both sensory modalities (e.g., intermodal analogy formation and synaesthesia) are still largely unknown, and will continue to be the subject of future sensory physiological and psychophysical research. This fact notwithstanding, the different potential variants with respect to realization (e.g., in terms of the selected analysis method, parameterization method, and respectively used displaying objects DO as well as the respective control functions via the lighting device BV) allow for their testing and evaluation by respective individually preferred aesthetic decision criteria, wherein the parameters and rules empirically found in the process can in turn be implemented in the respective processual determinants of the MVI, so that the aforesaid music visualization can also serve as a suitable open system in the sense of an experimental platform for both scientific research and subjective investigation of synaesthetic phenomena.

Viewed in more general terms, the single basic purpose and function of the MVI is thus to achieve an instantaneous and strongest possible sensory correlation between what is heard and seen using several different kinds of procedural steps, as well as according to various concepts and strategies.

A first procedural step involves automatically evaluating respectively determined representative and/or significant music-specific or psychophysical attributes and/or features from the just recorded audio material and in that case from the audio signals VS1 . . . VSm, largely simultaneously thereto (so-called feature extraction). As a rule, this is accomplished through the use of known technical means, for example of the kind used for automated pattern recognition and/or sound analysis and/or dynamic analysis, e.g., by way of algorithms suitable for this purpose (e.g., based on neuronal networks, linear and/or nonlinear system theory, etc.), which are respectively implemented in the respective MVI, so that the features that were here derived and correspondingly classified based on various, if necessary parallel running analytical processes and according to predetermined criteria are themselves also representative for specific selected characteristics of the related presented music. As a consequence, depending on the intention of the user, a certain number of different specific features can be obtained simultaneously, wherein either a single selected specific feature or features respectively compiled from a specific group (e.g., in a meta-representation in the form of specific, multi-dimensional feature vectors, or in an n-dimensional feature space-space spanned via the related feature vectors) each characterize specific auditory aspects of the present musical structure in a respectively applicable manner.

The ensuing second procedural step relates to another basic function of the MVI, specifically the automated translation or interpretation (so-called algorithmic interpretation) of certain music-specific attributes or characteristics for their optical display in corresponding homologous visual manifestations within one or a respectively spatially arranged and correspondingly configured ensemble of displaying objects DO. In particular, the objective first involves parameterizing the varying features that were derived in the first step from one and the same respectively recorded audio signal or from the related data stream, and each represent different auditory characteristics, in as adequate a way as possible for this purpose, so that a respective number of correspondingly suitable parallel and chronologically correlating signal tracks MSSout is derived from this, wherein the respective instantaneous output variable of each individual signal track at every point in time represents the respective intensity value for the related feature, specifically in the form of a signal amplitude analog thereto.

The following third procedural step involves a user evaluation and decision, which can be performed via a correspondingly designed user interface (U1 on FIG. 9) with a corresponding input function, which extend to the targeted access to different processes and parameters relating to the other signal paths. On the one hand, this allows the user to make a specific selection from a plurality of possible parametric signal tracks, which in the respective application are intended to actuate the respectively used OME within the BV. On the other hand, several signal tracks can, if need be, also be further prepared or linked in this conjunction, wherein use is made of known electronic means, thereby enabling an additional weighting and/or mixing and/or modulation and/or transformation of the respectively involved signal portions, for example. As a result, the user can effect a respectively suitable visualization based on his or her aesthetic or functional preferences. Adapting the MVI in this way makes it possible to use the polarization optical system for the respectively varying translation of any correspondingly configured visual representation that is parametrically controlled or animated in terms of the auditory characteristics.

In terms of its generalized functionality, each MVI represents a respective form of oparationalization of an automated or semi-automated and correspondingly developed interpretation process (so-called algorithmic interpretation) in all applications. For example, these varying aspects with respect to the same musical material can involve the related temporal development (e.g., tempos, pauses, accelerando, ritardando, to name but a few) along with the dynamics (forte, piano, accent) and/or frequency (pitches, tonalities, harmonies, etc.). Parameterized in the appropriate way, several analog output signals MSSout are thus present in parallel at the output OUT of the MVI, their related signal progressions each reflecting certain feature-specific details of musical attributes, and are transformed by means of the downstream signal processor SP into the respective control signals Vsi for actuating the BV. As a consequence, it is incumbent upon each user to achieve a suitable visualization based upon the respectively set and correspondingly arranged displaying objects along with the latent image information contained therein as well as the respectively preferred color palette in conjunction with the algorithmic interpretation process respectively favored by the MVI, wherein a correspondingly visible and intuitively tangible metaphor of the musical composition comes through in a processual sense, thereby imparting a direct, reciprocal sensory and meaningful correlation between the acoustic and visual sensory experience in terms of what has just been heard and seen. Therefore, there can exist no generally valid solution with respect to the perception and expectation intended by the user in terms of a suitable music visualization, which to a large extent is determined by the subjective aesthetic and psychophysical criteria of the respective recipient, which is also why there can also be no single, binding approach for determining the functions respectively implemented within the MVI in question.

The following exemplary embodiment is intended to serve as a reference point; it has been tested, and can also be set up with a comparatively low expenditure, as a quasi-minimal configuration for an appropriate music visualization.

The respective polarization optical system can here be designed in accordance with the variants shown on FIG. 5A to 5E, wherein the respective lighting device BV according to FIG. 3 can contain two optical modulation units OME1; OME2 as well as two correspondingly configured structured retarder elements SRE1; SRE2. Standard Twisted Nematic Cells INC can here be advantageously used as the OME, which are each actuated via an amplitude-modulated signal (selectable carrier frequency of between 200 Hz-1 Khz, for example), wherein modulation takes place using the respective low-frequency control signal VS1 or VS2. In order to adjust the actuation to the respective characteristic line of the INC, the degree to which the modulator is modulated can be correspondingly varied on the one hand, and the usable dynamic range can be adjusted through corresponding dynamic compression on the other, in the event that very large dynamic differences for the related signal level should arise, or the color dynamic and/or variation range of the aforesaid optical effects are to be limited to a specific level in a desired manner. Whether to design the respective displaying object DO with correspondingly configured polarization optical image elements POB here depends on the respective intention of the user. FIGS. 6A, 6B, 7, 8 can serve as related examples for this purpose. According to FIG. 9, two audio signal sources with the signals AQ1; AQ2 are routed to the audio processor AP, which relays the audio signals AS1; AS2 on to the respective sound transducers SW, e.g., as stereo signals. At the output OUTv of the AP, analog signals can either be routed to the analog input of the music visualization interface MVI following a corresponding level adjustment, or also be present in a digital form, so that the related data stream is relayed to the MVI by way of a corresponding interface. The expert in this area is familiar with corresponding means (e.g., analog or digital signal processing and signal analysis, etc.) with which the basic processing steps described below can be realized in different ways. For example, the first signal VS1 can be routed to an analysis process implemented within the MVI, e.g., in which the respective signal is subjected to FFT (fast Fourier transform), wavelet analysis or other procedures, and the respective sound spectrum is calculated, for example in discrete time windows and frequency bands. The respective spectra are further processed from the appropriate standpoints to evaluate significant acoustic features, wherein the temporal development of the spectral amplitudes within one or several respectively selected, predetermined frequency bands can form a related feature vector, for example. In addition to the spectral, correspondingly weighted intensity portions of the respective sound spectrum (e.g., with respect to the formants), a spectral differentiation is optionally also obtained with regard to the tonal (harmonic) or noisy portions. These features derived with respect to the first signal VS1 could essentially relate to the temporal development of tonal aspects as music-specific attributes.

Different signal processing functions (filter functions, synthesis functions, transducer functions, modulation functions, control and linkage functions, time delays, frequency shifts as well as diverse mathematical or logical operations, to name but a few) are then used to combine, in the manner desired, these dynamically varying parameter strings according to their temporal relation to yield a representative analog profile of related signal amplitudes for signal P1(t), which in terms of its successive dynamic development behaves synchronously to what was just heard. If need be, the audio signal can also be reproduced with a certain delay (latency) by way of compensation in order to achieve a sufficient synchronicity between the visualization and audio signal, since the internal processes of the MVI may be encumbered with a certain processing time. The signal processor SP is used to correspondingly adjust the signal SP1(t) to the requirements for actuating the OME1 within the BV via the control signal VS1. While visualizing the aforesaid optical effects with respect to the related motifs within the displaying object DO, the control signal VS1 can hence be used to animate specific tonal features of the musical presentation in corresponding dynamic color variations in conjunction with a respectively desired color palette.

Visualization takes place with an enhanced impression and complexity when the animation is subjected to additional temporal control by another optical modulation element OME2, which is actuated via the related control signal VS2, and is here derived from different music-specific features, as in the case of the VS1, so that the resultant movements and color progressions arising in the DO interpenetrate in an intricate, and yet determined manner. To this end, corresponding envelope curves (e.g., envelope followers) are formed out of signal VS2 by means of the MVI, which additionally represent the volume progression, and hence reflect another musical aspect in terms of dynamics and rhythm. In this case as well, use can be made of other additional and known means of further signal processing so as to arrive at a desired result.

Proven industrially available modular systems (e.g., DSP), programming environments and related system peripheries can advantageously also be used for practical realization, which are tailored specifically to real-time audio processing (e.g., MAX, REAKTOR, to name but a few), and utilize the corresponding tools.

The invention claimed is:

1. A system for modulating and displaying optical effects, said system comprising:
    a lighting device in modular design, including
        a light source configured to generate a first beam light,
        at least one input polarization unit (POE) individually configurable to modify polarization of said first beam of light in a manner that will establish polarized regions and which depends on a position across said first beam of light, thereby forming a second beam of light, and
        at least one optical modulator element (OME) adapted to and being individually actuated to parametrically modulate at least one of polarization and retardance of said second beam of light in at least one of time-dependent manner and a manner that depends on a position across said second beam of light, thereby forming a parametrically modulated beam of light with a specified spatial and/or temporally structured, yet constantly invisible internal composition;
    a displaying object of any shape and dimension located outside of and in any distance from the lighting device and transmitting said modulated beam of light received from the lighting device, said displaying object containing
        at least one object retarder unit (POB) containing at least one optically anisotropic material acting as a polarization optical image element by exhibiting a latent piece of image information in the form of an image-addressable optical path difference Γi (x,y), configured to modify a retardance of said modulated beam and to impress image information into said modulated beam, and
        an output polarizer (PE) adapted to transmit said modulated beam configured for the visualization of the image information impressed therein.

2. A system according to claim 1, wherein said at least one object retarder unit (POB) is configured to impress image information into said modulated beam reversibly.

3. A system according to claim 1, wherein at least one of the input polarization unit (POE) and output polarizer (PE) is removable from said system.

4. A system according to claim 1, wherein at least a portion of said input polarization unit (POE) includes a non-polarizing light filter.

5. A system according to claim 1, wherein said optical modulator element (OME) includes at least one mesogenic material.

6. A system according to claim 1, wherein said displaying object further includes a reflection unit.

7. A system according to claim 1, wherein said displaying unit further includes at least one flexural resonator configured to generate an acoustic wave.

8. A system according to claim 7, wherein said flexural resonator is disposed in or on the object retarder unit (POB).

9. A system according to claim 1, wherein said optical modulator element (OME) is configured to modify at least one of polarization and retardance of light in response to being exposed to energy.

10. A system according to claim 9, wherein said energy is generated by at least one of a mechanical energy generator, sonic energy generator, thermal energy generator, electrical energy generator, magnetic energy generator, and electromagnetic energy generator and is impingent on sat at least one mesogenic material.

11. A system according to claim 1, wherein said lighting device further includes at least one structured retarder element (SRE) configured to modify a retardance of a beam of light traversing said at least one structured retarder element in at least one of time-dependent manner or a manner dependent on a position across said beam of light.

12. A system according to claim 11, wherein at least one of the optical modulator element (OME) and structured retarder element (SRE) contains at least one optically-anisotropic material.

13. A system according to claim 11, wherein at least one of the optical modulator element (OME), structured retarder element (SRE), and object retarder unit (POB) includes a material having at least one of position-dependent optical anisotropy, position-dependent orientation of a material property, and position-dependent helical pitch.

14. A method for light modulation and displaying optical effects the method comprising:

receiving a beam of light with at least one optical modulator element (OME);

forming a parametrically modulated beam of light which appears as a whole to the naked eye as a permanent, unchangingly homogeneous composition without any discernible or distinguishable structure or brightness and/or contrast by transmitting said received beam of light through said at least one optical modulator element (OME), said forming including modifying at least one of polarization and retardance of light traversing the at least one optical modulator element (OME) in at least one of time-dependent manner and a manner that depends on a position across said received beam of light by exposing said optical modulator element (OME) to external energy; and impinging said modulated beam of light on a displaying object including at least one object retarder unit (POB), said object retarder unit (POB) being exposed to at least one of external energy, material transformation, structural change to impress image information in form of an image addressable optical path difference $\Gamma i$ (x,y) into said modulated beam of light, wherein the impressing is carried our in at least one of a time-dependent manner and a manner that depends on a position across said modulated beam of light; and forming visually-perceivable optical effects by impressing image information into said modulated beam of light at an output polarizer (PE) of said displaying object.

15. A method according to claim 14, wherein said exposing to external energy includes exposing at least one mesogenic material to external energy.

16. A method according to claim 14, wherein said forming visually-perceivable optical effects includes forming an optical image in transmission through said displaying object.

17. A method according to claim 14, wherein said forming includes reflecting said modulated beam at said displaying object to form a viewable reflected beam of light.

18. A method according to claim 14, wherein said impinging includes impinging said modulated beam of light on a displaying object to irreversibly impress image information into said modulated beam of light.

19. A method according to claim 14, wherein said exposing to external energy corresponds to a base signal (Si).

20. A method according to claim 19, wherein said exposing to external energy corresponds to a base signal (Si) associated with at least one audio signal (SS1, SS2).

21. A method according to claim 14, wherein said forming includes canceling polarization of at least a portion of a beam of light.

22. A method according to claim 21, wherein said canceling includes removing at least one of an input polarization unit (POE) and output polarizer (PE).

* * * * *

UNITED STATES PATENT AND TRADEMARK OFFICE
CERTIFICATE OF CORRECTION

Page 1 of 1

PATENT NO. : 8,817,372 B2
APPLICATION NO. : 13/508333
DATED : August 26, 2014
INVENTOR(S) : Prehn It is certified that error appears in the above-identified patent and that said Letters Patent is hereby corrected as shown below:

In the Specification

Col. 9, line 14 "By," should be --BV,--
Col. 9, line 41 "Fi" should be --Γi--
Col. 9, line 63 "VX" should be --vλ--
Col. 10, line 40 "Nino" should be --Nitto--
Col. 11, line 52 "sterns" should be --stems--
Col. 12, line 16 "BY" should be --BV--
Col. 12, line 26 "BY" should be --BV--
Col. 12, line 27 "BY" should be --BV--
Col. 12, line 64 "ROME" should be --AOME--
Col. 17, line 65 "(3," should be --β,--
Col. 19, line 42 "131" should be --BI--
Col. 24, line 30 "INC" should be --TNC--
Col. 24, line 36 "INC" should be --TNC--

Signed and Sealed this
Twentieth Day of January, 2015

Michelle K. Lee
*Deputy Director of the United States Patent and Trademark Office*